(12) United States Patent
Kim et al.

(10) Patent No.: US 12,118,177 B2
(45) Date of Patent: Oct. 15, 2024

(54) METHOD AND APPARATUS FOR DISPLAYING APPLICATION

(71) Applicant: Samsung Electronics Co., Ltd., Suwon-si (KR)

(72) Inventors: Young-jin Kim, Suwon-si (KR); Sung-hee Kim, Suwon-si (KR); Seung-woon Lee, Suwon-si (KR); Kang-tae Kim, Seongnam-si (KR); Tae-soo Kim, Suwon-si (KR); Jung-hwan Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/320,479

(22) Filed: May 19, 2023

(65) Prior Publication Data
US 2023/0289023 A1 Sep. 14, 2023

Related U.S. Application Data

(63) Continuation of application No. 17/838,814, filed on Jun. 13, 2022, now Pat. No. 11,698,706, which is a (Continued)

(30) Foreign Application Priority Data

Jul. 31, 2013 (KR) .................. 10-2013-0091174

(51) Int. Cl.
*G06F 3/048* (2013.01)
*G06F 3/0481* (2022.01)
(Continued)

(52) U.S. Cl.
CPC .......... *G06F 3/0481* (2013.01); *G06F 3/0482* (2013.01); *G06F 3/04842* (2013.01);
(Continued)

(58) Field of Classification Search
CPC ...... G06F 9/451; G06F 3/0481; G06F 3/0482; G06F 3/04842; G06F 3/04845;
(Continued)

(56) References Cited

U.S. PATENT DOCUMENTS 6,542,165 B1 4/2003 Ohkado
7,681,143 B2 3/2010 Lindsay et al.
(Continued)

FOREIGN PATENT DOCUMENTS

CN 1750546 A 3/2006
CN 101075173 A 11/2007
(Continued)

OTHER PUBLICATIONS

Chinese Office Action with English translation dated Dec. 18, 2018; Chinese Appln. No. 201480043502.0.
(Continued)

*Primary Examiner* — Mahelet Shiberou
(74) *Attorney, Agent, or Firm* — Jefferson IP Law, LLP

(57) ABSTRACT

A method of displaying an application is provided. The method includes displaying an execution screen of a first application on a first area when the first application is executed, displaying the execution screen of the first application on a second area instead of on the first area when a second application is executed while the first application is executed, and displaying an execution screen of a second application on the first area.

20 Claims, 28 Drawing Sheets

Related U.S. Application Data continuation of application No. 17/235,505, filed on Apr. 20, 2021, now Pat. No. 11,429,244, which is a continuation of application No. 14/905,106, filed as application No. PCT/KR2014/007037 on Jul. 31, 2014, now Pat. No. 10,990,237.

(51) Int. Cl.

| | | |
|---|---|---|
| *G06F 3/0482* | (2013.01) | |
| *G06F 3/04842* | (2022.01) | |
| *G06F 3/04845* | (2022.01) | |
| *G06F 3/0488* | (2022.01) | |
| *G06F 3/04883* | (2022.01) | |
| *G06F 3/04886* | (2022.01) | |
| *G06F 9/451* | (2018.01) | |
| *G06F 3/14* | (2006.01) | |
| *G09G 5/14* | (2006.01) | |

(52) U.S. Cl.
CPC ........ *G06F 3/04845* (2013.01); *G06F 3/0488* (2013.01); *G06F 3/04883* (2013.01); *G06F 3/04886* (2013.01); *G06F 9/451* (2018.02); *G06F 3/14* (2013.01); *G09G 5/14* (2013.01)

(58) Field of Classification Search
CPC ............... G06F 3/0488; G06F 3/04883; G06F 3/04886; G06F 3/14; G09G 5/14
See application file for complete search history.

(56) References Cited

U.S. PATENT DOCUMENTS

| | | | |
|---|---|---|---|
| 8,106,887 B2 | 1/2012 | Park et al. | |
| 8,978,047 B2 | 3/2015 | Hill et al. | |
| 9,116,594 B2 | 8/2015 | Hwang et al. | |
| 9,213,365 B2 | 12/2015 | Sirpal et al. | |
| 9,215,306 B2 | 12/2015 | Kim et al. | |
| 9,483,160 B2 | 11/2016 | Jung et al. | |
| 9,916,072 B2 | 3/2018 | Song et al. | |
| 9,983,664 B2 | 5/2018 | Kim et al. | |
| 10,095,368 B2* | 10/2018 | Choi | G06F 3/04817 |
| 10,649,644 B2 | 5/2020 | Ma | |
| 2004/0003395 A1 | 1/2004 | Srinivas et al. | |
| 2004/0075769 A1 | 4/2004 | Shy et al. | |
| 2005/0283800 A1 | 12/2005 | Ellis et al. | |
| 2006/0020904 A1 | 1/2006 | Aaltonen et al. | |
| 2006/0224991 A1 | 10/2006 | Stabb et al. | |
| 2006/0245736 A1 | 11/2006 | Affaki | |
| 2006/0248404 A1 | 11/2006 | Lindsay et al. | |
| 2006/0248471 A1 | 11/2006 | Lindsay et al. | |
| 2007/0083911 A1 | 4/2007 | Madden et al. | |
| 2007/0250787 A1 | 10/2007 | Kawahara et al. | |
| 2008/0072146 A1 | 3/2008 | Sung et al. | |
| 2008/0163082 A1 | 7/2008 | Rytivaara | |
| 2008/0204424 A1 | 8/2008 | Jin et al. | |
| 2008/0307360 A1 | 12/2008 | Chaudhri et al. | |
| 2008/0307364 A1 | 12/2008 | Chaudhri et al. | |
| 2009/0259942 A1 | 10/2009 | Bitonti et al. | |
| 2010/0122195 A1 | 5/2010 | Hwang | |
| 2010/0162182 A1 | 6/2010 | Oh et al. | |
| 2010/0173677 A1 | 7/2010 | Fu | |
| 2010/0211872 A1 | 8/2010 | Rolston et al. | |
| 2010/0248788 A1 | 9/2010 | Yook et al. | |
| 2011/0175930 A1 | 7/2011 | Hwang et al. | |
| 2011/0202872 A1 | 8/2011 | Park | |
| 2011/0225539 A1 | 9/2011 | Lee et al. | |
| 2011/0244924 A1 | 10/2011 | Jung et al. | |
| 2011/0252380 A1 | 10/2011 | Chaudhri | |
| 2012/0054674 A1* | 3/2012 | Beykpour | G06F 3/0481 715/788 |
| 2012/0092438 A1 | 4/2012 | Guzman Suarez et al. | |
| 2012/0131496 A1 | 5/2012 | Goossens et al. | |
| 2012/0131519 A1 | 5/2012 | Jitkoff | |
| 2012/0159386 A1* | 6/2012 | Kang | G06F 3/04883 715/800 |
| 2012/0210273 A1 | 8/2012 | Seong et al. | |
| 2012/0278756 A1 | 11/2012 | Shah et al. | |
| 2013/0072264 A1 | 3/2013 | Koo et al. | |
| 2013/0091451 A1 | 4/2013 | Holecek et al. | |
| 2013/0120294 A1 | 5/2013 | Sun et al. | |
| 2013/0125045 A1 | 5/2013 | Sun et al. | |
| 2013/0151623 A1 | 6/2013 | Weiser et al. | |
| 2013/0174179 A1 | 7/2013 | Park et al. | |
| 2013/0227419 A1* | 8/2013 | Lee | G06F 9/48 715/728 |
| 2013/0332881 A1 | 12/2013 | Yook et al. | |
| 2014/0096055 A1 | 4/2014 | Jung et al. | |
| 2014/0137020 A1 | 5/2014 | Sharma et al. | |
| 2014/0157163 A1 | 6/2014 | Strutin-Belinoff et al. | |
| 2014/0208276 A1 | 7/2014 | Park | |
| 2014/0337791 A1 | 11/2014 | Agnetta et al. | |
| 2014/0359504 A1 | 12/2014 | Kim | |
| 2015/0185980 A1 | 7/2015 | An et al. | |

FOREIGN PATENT DOCUMENTS

| | | |
|---|---|---|
| CN | 101133381 A | 2/2008 |
| CN | 101167122 A | 4/2008 |
| CN | 101315593 A | 12/2008 |
| CN | 101594427 A | 12/2009 |
| CN | 101882049 A | 11/2010 |
| CN | 102193764 A | 9/2011 |
| CN | 102208179 A | 10/2011 |
| CN | 102215290 A | 10/2011 |
| CN | 102365617 A | 2/2012 |
| CN | 102426507 A | 4/2012 |
| CN | 102467318 A | 5/2012 |
| EP | 0 247 827 A2 | 12/1987 |
| EP | 2 573 668 A2 | 3/2013 |
| JP | 2005-071387 A | 3/2005 |
| KR | 10-2011-0093541 A | 8/2011 |
| KR | 10-2013-0054042 A | 5/2013 |
| KR | 10-2013-0054073 A | 5/2013 |
| KR | 10-2013-0080267 A | 7/2013 |

OTHER PUBLICATIONS

Chinese Office Action dated Jun. 5, 2019, issued in Chinese Patent Application No. 201480043502.0.
European Communication of Minutes (Form 2009) dated Jun. 13, 2019, issued in European Patent Application No. 14 832 929.5.
European Decision to Refuse dated Jun. 24, 2019, issued in European Patent Application No. 14 832 929.5.
Korean Office Action dated Sep. 27, 2019, issued in Korean Patent Application No. 10-2013-0091174.
Chinese Office Action dated Oct. 22, 2019, issued in Chinese Patent Application No. 201480043502.0.
Korean Final Rejection dated Mar. 30, 2020, issued in Korean Patent Application No. 10-2013-0091174.
Indian Office Action dated Jul. 10, 2020, issued in Indian Patent Application No. 201627002382.
Korean Notice Of Allowance dated Mar. 5, 2021, issued in Korean Patent Application No. 10-2020-0104809.
Chinese Office Action dated Sep. 3, 2021, issued in a counterpart Chinese Application No. 201480043502.0.
Chinese Notice of Allowability dated Oct. 9, 2021, issued in a counterpart Chinese Application No. 201480043502.0.
Extended European Search Report dated Aug. 12, 2022, issued in European Patent Application No. 22179043.9.
Extended European Search Report dated Aug. 12, 2022, issued in European Patent Application No. 22179047.0.
European Communication dated Jan. 11, 2023; European Patent Application No. 22 179 043.9-1001.
European Communication dated Jan. 11, 2023; European Patent Application No. 22 179 047.0-1001.
Robert Dyer; How to make vista taskbar transparent; XP093053642; https://www.youtube.com/watch?v=hoHFkPDstAE; Dec. 19, 2010.

(56) References Cited

OTHER PUBLICATIONS

European Communication under Rule 71(3) EPC dated Jul. 20, 2023; European Appln. No. 22 179 043.9-1001.
European Communication pursuant to Article 94(3) EPC dated Jun. 19, 2023; European Appln. No. 22 179 047.0-1001.
European Communication under Rule 71(3) EPC dated Sep. 29, 2023; European Appln. No. 22 179 043.9-1001.
European Communication under Rule 71(3) EPC dated Jan. 5, 2024; European Appln. No. 22 179 047.0-1001.
Chinese Office Action with English translation dated Jan. 30, 2024; Chinese Appln. No. 202111304344.8.
Chinese Office Action with English translation dated Jun. 13, 2024; Chinese Appln. No. 202111304656.9.
Extended European Search Report dated Jul. 22, 2024; European Appln. No. 24171722.2-1001/4379522.
Indian Office Action dated Jun. 19, 2024; Indian Appln. No. 202128048095.

\* cited by examiner

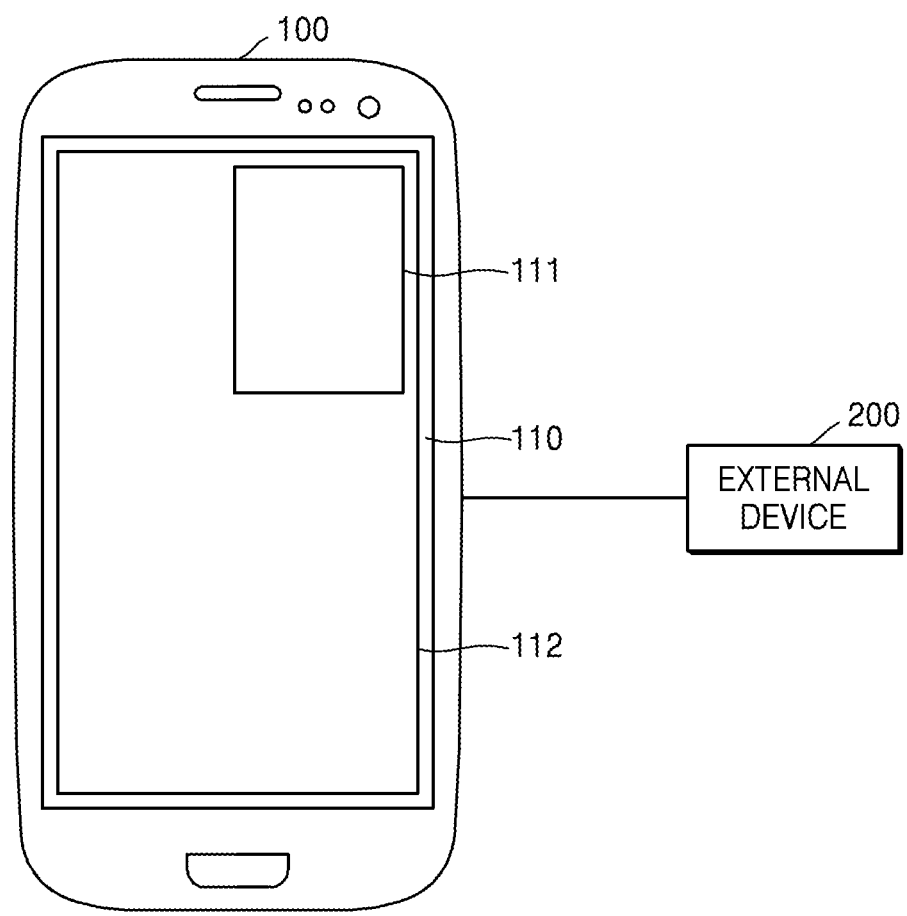

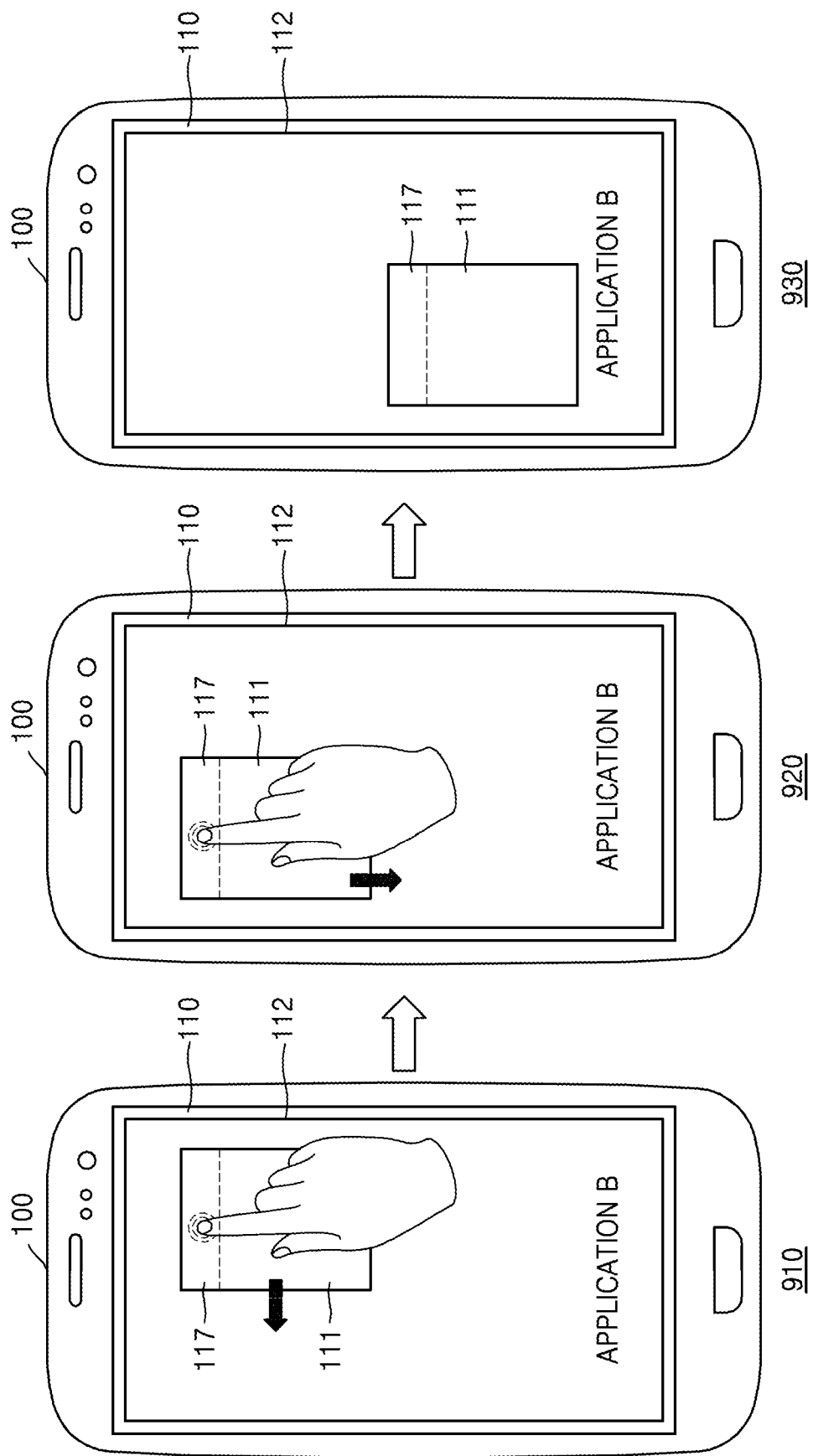

METHOD AND APPARATUS FOR DISPLAYING APPLICATION

CROSS-REFERENCE TO RELATED APPLICATION(S)

This application is a continuation application of prior application Ser. No. 17/838,814 filed on Jun. 13, 2022; which is a continuation application of prior application Ser. No. 17/235,505 filed on Apr. 20, 2021, which has issued as U.S. Pat. No. 11,429,244 on Aug. 30, 2022; which is a continuation application of prior application Ser. No. 14/905,106 filed on Jan. 14, 2016, which has issued as U.S. Pat. No. 10,990,237 on Apr. 27, 2021; and which is based on a U.S. National Stage application under 35 U.S.C. § 371 of an International application filed on Jul. 31, 2014 and assigned application number PCT/KR2014/007037, which claimed the benefit of a Korean patent application filed on Jul. 31, 2013 in the Korean Intellectual Property Office and assigned Serial number 10-2013-0091174, the entire disclosure of each of which is hereby incorporated by reference.

TECHNICAL FIELD

The present disclosure relates to a method and apparatus for displaying applications on windows.

BACKGROUND

When a terminal device can perform multitasking in which two or more applications are simultaneously executed, the terminal device may display execution screens of the applications on at least two windows. The at least two windows capable of displaying the execution screens of the applications may be referred to as multi-windows.

A user may control the terminal device to simultaneously perform tasks using the multi-windows. Therefore, if the multi-windows are easily controlled, the user may easily perform the multitasking in the terminal device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for displaying applications on windows. Additional aspects will be set forth in part in the description which follows and, in part, will be apparent from the description, or may be learned by practice of the presented embodiments.

According to various embodiments, display areas of applications displayed on a full-sized window and a sub-window may be easily changed.

As described above, according to various embodiments, an application displayed on a full-sized window and applications displayed on sub-windows.

In accordance with an aspect of the present disclosure, a method of displaying an application is provided. The method includes displaying an execution screen of a first application on a first area when the first application is executed, displaying the execution screen of the first application on a second area instead of on the first area when a second application is executed while the first application is executed, and displaying an execution screen of a second application on the first area.

The method may further include detecting a user gesture in the second area, displaying the execution screen of the first application on the first area instead of the second area in response to the detected user gesture, and displaying an execution screen of any one of applications being executed in a terminal device on the second area.

The method may further include displaying the second area in a hide mode.

The displaying of the second area in the hide mode may include displaying at least one of alternative images indicating the second area, a transparent portion of the second area, and a portion of the second area instead of displaying the second area and displaying the second area in the hide mode when no a user gesture is input for requesting hiding of the sub-window is omitted or a user gesture for the second area is omitted.

The displaying of the second area in the hide mode may include detecting a user gesture requesting release of an automatic hide mode that is set for the second area, releasing the automatic hide mode that is set for the second area in response to the detected user gesture, and when an input regarding the second area is not detected for a predetermined amount of time, displaying the second area in the hide mode according to whether the automatic hide mode is set for the second area.

The displaying of the sub-window in the hide mode may include detecting a user gesture for requesting a release of an automatic hide mode that is set for the second area, releasing the automatic hide mode that is set for the second area in response to the gesture, when no input with regard to the second area is detected for a predetermined amount of time, displaying the second area in the hide mode according to whether the second area is in the automatic hide mode.

The first area may be an entire area of a display screen of a terminal device, an execution screen of an application, which is decreased in size while maintaining a proportion and which overlaps with the first area, may be displayed on the second area, and the second area may be a portion of the entire area of the display screen of the terminal device.

The method may further include detecting a user gesture with regard to the second area and changing a size of the second area and displaying the second area according to the changed size in response to the detected gesture.

The method may further include detecting a user gesture with regard to the second area and moving the second area in response to the detected gesture.

The method may further include detecting a user gesture for displaying a list and displaying an execution screen of at least one application being executed in a terminal device on the second area in a sub-window in response to the detected gesture. The sub-window mode may be in one of a stack mode and a list mode.

The displaying of the execution screen of the at least one application on the second area in the sub-window mode may include selecting one of applications displayed on the second area and displaying the selected application on the first area.

The displaying of the execution screen of the at least one application on the second area in the sub-window mode may include displaying a plurality of execution screens of applications from among applications being executed in the terminal device, wherein the plurality of execution screens overlap one another and are displayed in a predetermined order, detecting a user gesture for changing an item, and displaying an execution screen of a next application in response to the detected gesture for changing the item.

The second area may include sub-window list groups including at least one sub-window displaying an execution screen of an application being executed in the terminal device, and the method of displaying the application may further include detecting a user gesture with regard to the sub-window list groups, determining whether an area where the detected gesture is detected is set as an area where the sub-window list groups are to be moved, and moving the sub-window list groups according to a result of the determination.

The method may further include receiving an input for requesting termination of an application, terminating display of the application on the first area in response to the received input, and displaying an application, which was displayed on the second area, on the first area.

A user gesture detected in the second area may be deemed a gesture for controlling the display of the execution screen of the second application on the second area.

The method may further include detecting a user gesture for changing a sub-window orientation and changing an orientation of an execution screen of an application displayed on the second area and displaying the execution screen having the changed orientation in response to the detected gesture for changing the sub-window orientation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A and 1B are examples of a display screen of a terminal device according to various embodiments of the present disclosure;

FIGS. 9A and 9B illustrate a method of controlling a sub-window according to areas where gestures are detected according to various embodiments of the present disclosure;

Throughout the drawings, it should be noted that like reference numbers are used to depict the same or similar elements, features, and structures.

DETAILED DESCRIPTION

Figure 1A:
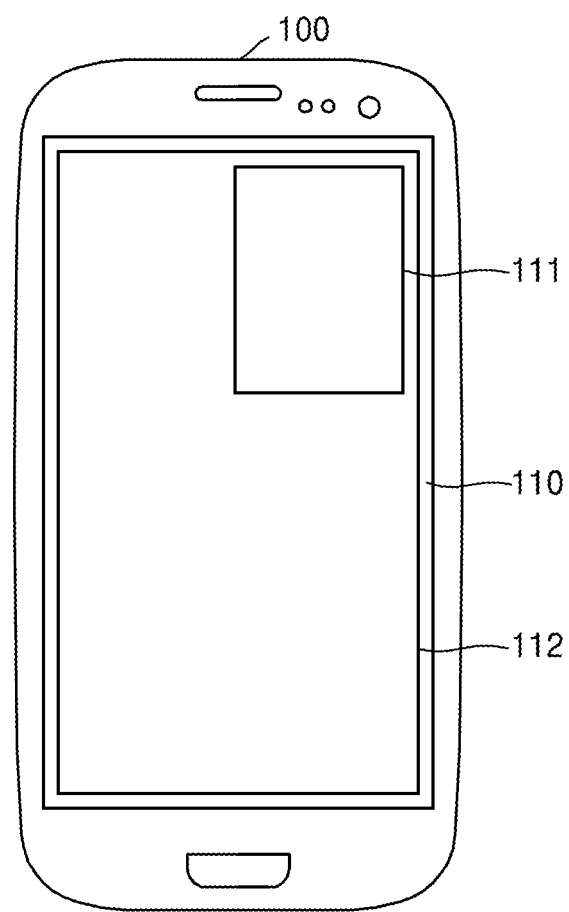

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure will now be described more fully with reference to the accompanying drawings, in which various embodiments of the disclosure are shown. In the description of the present disclosure, if a detailed description of commonly-used technologies or structures related to the disclosure may unnecessarily obscure the subject matter of the disclosure, the detailed description will be omitted. Also, since later-described terms are defined in consideration of the functions of the present disclosure, they may vary according to users' intentions or practice.

It will be further understood that the terms "comprises" and/or "comprising" used herein specify the presence of stated features or components, but do not preclude the presence or addition of one or more other features or components. Also, the terms "unit", "module", etc. are units for processing at least one function or operation and may be executed as hardware, software, or a combination of hardware and software.

The touch gesture of the user may include a tap, a touch and hold, a double tap, a drag, a pan input, a flick, a drag and drop, or the like.

A "tap" input is a user's motion of touching a screen by using a finger or a touch tool such as an electronic pen and then lifting the finger or touch tool from the screen without moving.

A "touch and hold" input is a user's motion of touching a screen by using a finger or a touch tool such as an electronic pen and then maintaining the above touching motion over a critical time (e.g., 2 seconds), after touching the screen. For example, a time difference between a touch-in time and a touch-out time is greater than or equal to the critical time, for example, 2 seconds. When a touch input lasts more than the critical time, in order to remind the user whether the touch input is tapping or touching and holding, a feedback signal may be provided in a visual, acoustic, or tactile manner. The critical time may vary according to embodiments.

A "double tap" input is a user's motion of touching the screen twice by using the finger or touch tool (such as a stylus pen).

A "drag" input is a user's motion of touching the screen by using the finger or touch tool and moving the finger or touch tool to another position on the screen while keeping the touching motion. The dragging motion may enable the moving or panning motion of an object.

A "pan" input is a user's motion of performing a dragging motion without selecting an object. Since no object is selected in the panning motion, no object is moved in a page but the page itself is moved on the screen or a group of objects may be moved within a page.

A "flick" input is a user's motion of performing a dragging motion over a critical speed, for example, 100 pixel/s, by using the finger or touch tool. The dragging (panning) motion or the flicking motion may be distinguished based on whether the moving speed of the finger or touch tool is over the critical speed, for example, 100 pixel/s, or not.

A "drag and drop" input is a user's motion of dragging an object to a predetermined position on the screen by using the finger or touch tool and then dropping the object at that position.

Throughout the specification, when a portion is "connected" to another portion, the portion may be "directly connected" to the other portion, and also the portion may be "electrically connected" to the other portion by interposing a device therebetween. Also, when a portion "includes" an element, another element may be further included, rather than excluding the existence of the other element, unless otherwise described.

Hereinafter, the present disclosure will be described by explaining various embodiments of the disclosure with reference to the attached drawings. Like reference numerals in the drawings denote like elements, and repeated descriptions will be omitted.

FIGS. 1A and 1B are examples of a display screen of a terminal device according to various embodiments of the present disclosure.

Referring to FIG. 1A, a terminal device 100 may include a display screen 110. The terminal device 100 is used by a user and may be implemented as, for example, a mobile phone, a smartphone, a laptop computer, a digital broadcasting device, a personal digital assistant (PDA), a portable multimedia player (PMP), a navigation device, a table personal computer (PC), etc. However, the terminal device 100 is not limited thereto and the terminal device 100 may be a device that is already commercialized or developed in the future.

As shown in FIG. 1A, the terminal device 100 may include the display screen 110 capable of displaying an execution screen of an application that is being executed in the terminal device 100.

The terminal device 100 may display one or more applications that are being executed on the display screen 110. In particular, execution screens of the applications being executed in the terminal device 100 may be simultaneously displayed on multiple areas of the display screen 110.

For example, the display screen 110 includes a sub-window 111 and a full-sized window 112. The terminal device 100 may simultaneously display the execution screens of the applications on the sub-window 111 and the full-sized window 112.

In an embodiment of the present disclosure, the full-sized window 112 may be an entire area of the display screen 110. In addition, the sub-window 111 may be a pop-up window that may overlap the full-sized window 112 of the display screen 110.

When the execution screens of the applications are respectively displayed on sub-window 111 or the full-sized window 112, controlling the sub-window 111 and the full-sized window 112 while the execution screens are displayed may be easier than controlling vertical areas that are determined by vertically dividing an entire area of the display screen 110.

For example, moving the sub-window 111 or adjusting a size thereof may be easier than moving one of the vertical areas or adjusting a size thereof.

The terminal device 100 may be in a window-on-window (WOW) mode in which the execution screens of the applications are displayed on the sub-window 111 and the full-sized window 112. In the WOW mode, the terminal device 100 may display execution screens of applications on the sub-window 111 or the full-sized window 112. When the WOW mode is inactive, the terminal device 100 may display an execution screen of an application on the full-sized window 112.

Hereinafter, a method of displaying execution screens of applications on the sub-window 111 or the full-sized window 112 is described as shown in FIG. 1A.

When the execution screens of the applications are displayed as the sub-window 111, the entire area of the display screen 110 may be divided into areas according to desired area type, area shape, or a dividing method. For example, the display screen 110 may be divided into top, bottom, left, and right areas. In FIG. 1A, the areas into which the display screen 110 is divided are the sub-window 111 and the full-sized window 112.

Referring to FIG. 1B, applications capable of being displayed on the terminal device 100 are not limited to applications being executed in the terminal device 100. For example, applications being executed in an external device 200 may be displayed on the display screen 110 of the terminal device 100. That is, the applications are executed in the external device 200, and execution results are transmitted from the external device 200 to the terminal device 100, thus displaying the execution results of the applications on the display screen 110 of the terminal device 100. Referring to FIG. 1B, the terminal device 100 receives the execution results of the applications from the external device 200 and displays the same on the display screen 110 of the terminal device 100.

The terminal device 100 may be connected to a cloud computing system. For example, when control signals are generated in the terminal device 100, the external device 200 receives and processes the generated control signals and may transmit a processing result to the terminal device 100. In addition, the terminal device 100 may display the processing result on the display screen 110. The control signals that may be generated in the terminal device 100 may include user input signals used to execute applications.

Hereinafter, a method of displaying one or more applications executed in the terminal device 100 will be described. However, the applications may be executed in other devices as well. That is, as described above, the displayed applications may be applications executed in the external device 200.

Figure 2A:
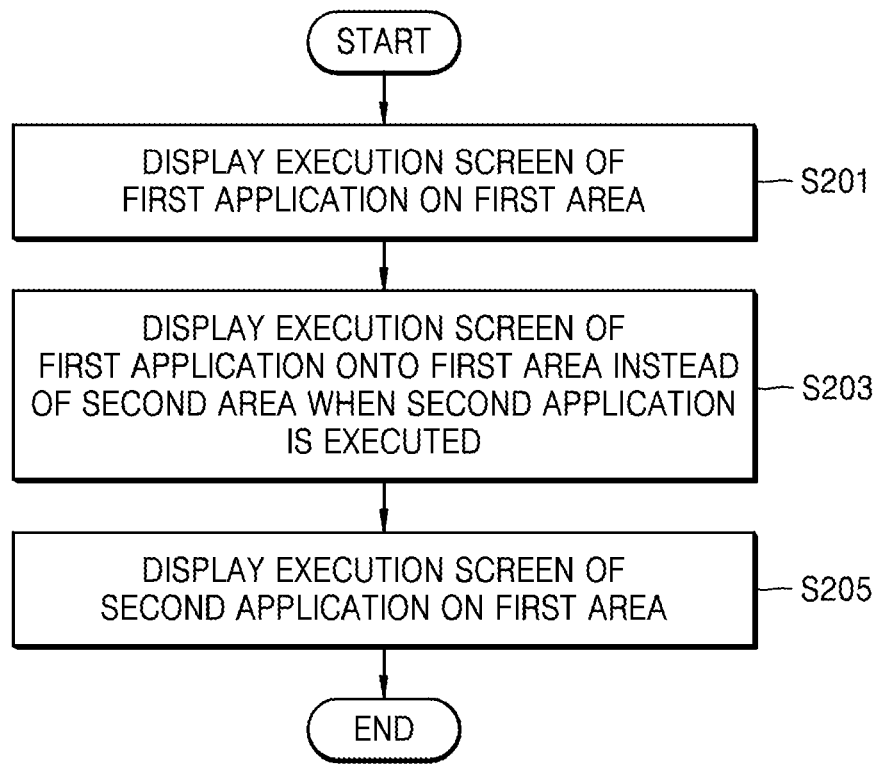
FIGS. 2A and 2B are flowcharts of methods of displaying applications according to various embodiments of the present disclosure.
Figure 2B:
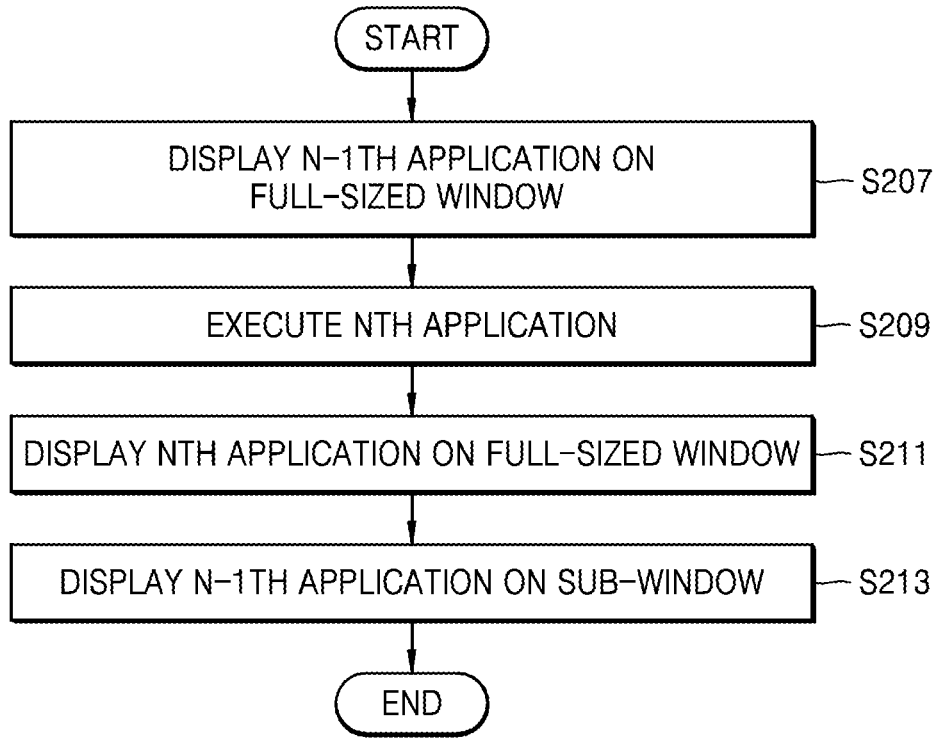

FIGS. 2A and 2B are flowcharts of methods of displaying an application according to various embodiments of the present disclosure.

Referring to FIG. 2A, the terminal device 100 may display an execution screen of a first application on a first area when the first application is executed in operation S201. In this case, the first area may be the full-sized window 112. For example, in operation S201, the execution screen of the first application including an execution result thereof may be displayed on the full-sized window 112.

In operation S203, the terminal device 100 may display the execution screen of the first application onto a second area instead of the first area when a second application is executed. In this regard, a second area may be the sub-window 111. For example, in operation S203, the execution screen of the first application including an execution result thereof may be displayed on the sub-window 111.

An effect indicating that the execution screen of the first application is displayed onto the sub-window 111 instead of the full-sized window 112 may also be output. The effect may include a visual effect and an auditory effect.

For example, the visual effect may include an effect via which the execution screen of the first application, which is displayed on the full-sized window 112, is gradually decreased and displayed on the sub-window 111. Moreover, the auditory effect may include an effect in which a 'click' sound is output when the execution screen of the first application is gradually decreased and displayed on the sub-window 111. A user of the terminal device 100 may easily recognize that the execution screen of the first application is displayed on the sub-window 111 instead of on the full-sized window 112 based on the simultaneous output of a visual effect and an auditory effect when the execution screen of the first application is displayed onto the sub-window 111 instead of the full-sized window 112.

When the execution screen of the first application is displayed on the sub-window 111 instead of on the full-sized window 112, the execution screen of the first application may be gradually decreased while maintaining a proportion and may be displayed on the sub-window 111.

In operation S205, the terminal device 100 may display an execution screen of the second application, which is executed in operation S203, on the first area. The first area may be the full-sized window 112.

In other words, when a new application is executed while an execution screen of an application is displayed on the full-sized window 112, an execution screen of the new application may be displayed on the full-sized window 112. In addition, the execution screen of the application, which is displayed on the full-sized window 112 before the execution screen of the new application is displayed on the full-sized window 112, may instead be displayed on the sub-window 111.

Therefore, when a new application is executed while another application is executed, since the execution screen of the application, which is displayed on the full-sized window 112, is displayed on the sub-window 111, the execution screen of the application may continue to be displayed on the display screen 110.

For example, when the terminal device 100 executes a web browser while the terminal device 100 displays an execution screen of a calculator application on the full-sized window 112, the execution screen of the calculator application is displayed on the sub-window 111 instead of on the full-sized window 112, and an execution screen of the web browser may be displayed on the full-sized window 112. Since the execution screen of the calculator application may overlap the execution screen of the web browser and be displayed on the sub-window 111, the user may use the web browser while checking results calculated by the calculator application displayed on the sub-window 111.

For example, when the terminal device 100 executes a new application while the terminal device 100 displays a video on the full-sized window 112, the video is displayed on the sub-window 111 instead of the full-sized window 112, and an execution screen of the new application may be displayed on the full-sized window 112. Thus, the user may continue to watch the video displayed on the sub-window 111 while controlling the new application displayed on the full-sized window 112. In this case, the video may be continuously reproduced even though the video is displayed onto the sub-window 111 instead of the full-sized window 112. Thus, the terminal device 100 may execute the new application and may continue to reproduce the video without temporarily pausing the same.

FIG. 2B is a flowchart of a method of displaying applications on a full-sized window or sub-windows based on the execution order of the applications.

A case where the second application is executed while the first application is displayed on the full-sized window 112 is described with reference to FIG. 2A, and a case where an $N^{th}$ application is executed while an N-1$^{th}$ application is displayed on the full-sized window 112 will be described with reference to FIG. 2B. In this case, the first and second applications in FIG. 2A may correspond to the N-1$^{th}$ and N$^{th}$ applications in FIG. 2B.

Referring to FIG. 2B, the terminal device 100 may display an execution screen of the N-1$^{th}$ application on the full-sized window 112 in operation S207. An execution screen of an N-2$^{th}$ application may be displayed on the sub-window 111 of the terminal device 100. When no application other than the N-1$^{th}$ application is being executed in the terminal device 100, the sub-window 111 may not appear.

The terminal device 100 may execute an N$^{th}$ application in operation S209. In the present embodiment, an execution order of applications may be an order in which the applications are executed in the terminal device 100 or may be a requested display order of execution screens of the applications. Therefore, the N$^{th}$ application, which is executed in operation S209, may be an application of which an nth request for displaying an execution screen is made. For example, the terminal device 100 selects one of the applications being executed in operation S209 and receives a request for displaying an execution screen of the selected application. The application of which the request for displaying the execution screen may be considered as the application which is executed nth.

In operation S211, the terminal device 100 may display the execution screen of the application executed N$^{th}$ on the full-sized window 112.

In operation S213, the terminal device 100 displays an execution screen of the N-1$^{th}$ application onto the sub-window 111 instead of the full-sized window 112.

In an embodiment of the present disclosure, the terminal device 100 may display execution screens of applications on the full-sized window 112 or the sub-window 111 according to an execution order of the applications or a requested display order of the execution screen of the applications. In particular, the terminal device 100 displays an execution screen of an application, which is recently executed or for which a display request is made, on the full-sized window 112 and may display an execution screen of an application, which is displayed on the full-sized window 112 before the above application is displayed on the full-sized window 112, on the sub-window 111.

Figure 3:
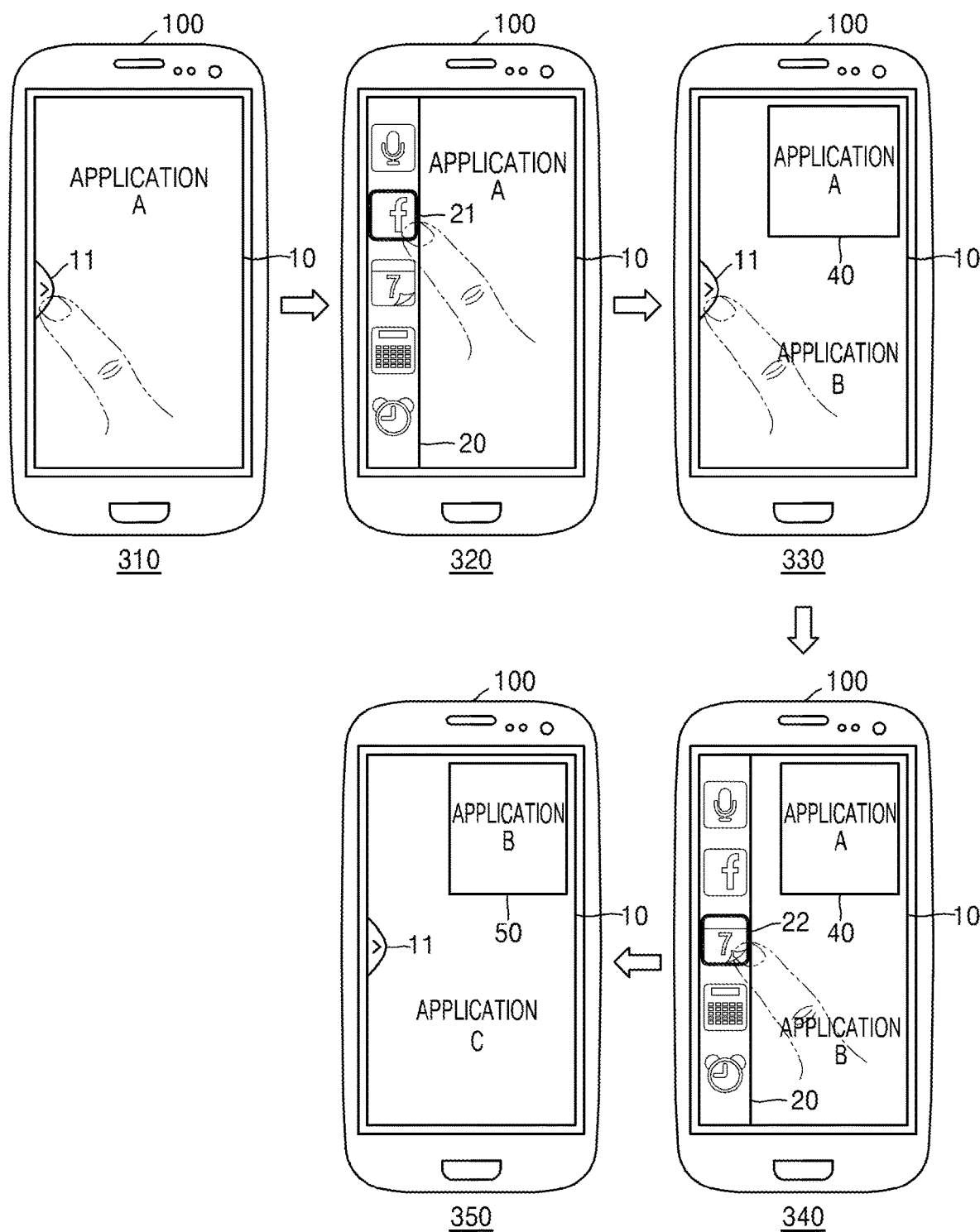
FIG. 3 illustrates a method of displaying applications according to an embodiment of the present disclosure.

FIG. 3 illustrates a method of displaying applications according to an embodiment of the present disclosure.

Referring to FIG. 3, a display screen 310 shows an execution screen of an application A displayed on a full-sized window 10. A button 11 for displaying an application list used to execute a new application may be selected. The display screen 310 may correspond to the first area on which the first application is displayed in operation S201 of FIG. 2A or the full-sized window 112 on which the N-1$^{th}$ application is displayed in operation S207 of FIG. 2B.

An application list 20, which may be executed when the button 11 is selected, may be displayed on a display screen 320. The application list 20 may include an application displayed in the WOW mode. An icon 21 of an application B included in the application list 20 may be selected to execute the application B. The operation of the display screen 320 may correspond to operation S203 of FIG. 2A or operation S209 of FIG. 2B.

The application A on the display screen 320 may correspond to the first application or the N-1$^{th}$ application. In addition, the application B may correspond to the second application or the N$^{th}$ application.

As a result of selecting the icon 21 of the application B, the application B is displayed on the full-sized window 10 on display screen 330, and the application A may be displayed on a sub-window 40. That is, the application B is not yet displayed on the display screens 310 and 320, and application A may be displayed on the sub-window 40 of the display screen 330 due to the execution of the application B. The display screen 330 may correspond to a case where the execution screen of the second application or the N$^{th}$ application is displayed on the first area or the full-sized window 10 as in operations S203 through S205 of FIG. 2A and the execution screen of the first application or the N-1$^{th}$ application is displayed on the second area or the sub-window 40 instead of the first area or the full-sized window 10 as in operations S211 through S213 of FIG. 2B.

The button 11 for displaying the application list 20 used to execute a new application may be selected on the display screen 330. The display screen 330 may correspond to a case where the execution screen of the first application is displayed as in operation S201 of FIG. 2A or the execution screen of the N-1$^{th}$ application is displayed as in operation S207 of FIG. 2B.

The application list 20, which may be executed on the display screen 320 as the button 11 is selected, may be displayed on display screen 340. An icon 22 of an application C included in the application list 20 may be selected to execute the application C. The display screen 340 may correspond to a case where the second application is executed as in operation S203 of FIG. 2A or the N$^{th}$ application is executed as in operation S209 of FIG. 2B.

The application B on the display screen 340 may correspond to the first application or the N-1$^{th}$ application. In addition, the application C may correspond to the second application or the N$^{th}$ application.

As a result of selecting the icon 22 of the application C on display screen 350, the application C is displayed on the full-sized window 10, and the application B may be displayed on a sub-window 50. That is, on the display screens 330 and 340 on which the application C is not yet displayed, the application B displayed on the full-sized window 10 may be displayed on the sub-window 50 due to the execution of the application C. The display screen 350 may correspond to a case where the execution screen of the second application or the N$^{th}$ application is displayed on the first area or the full-sized window 112 as in operations S203 through S205 of FIG. 2A and the execution screen of the first application or the N-1$^{th}$ application is displayed on the second area or the sub-window 111 instead of the first area or the full-sized window 112 as in operations S211 through S213 of FIG. 2B.

A method described above includes displaying a new application by pressing the button 11 requesting the display of an application list. However, the method is not limited thereto and the applications may be executed through various methods.

For example, in the case of an alarm clock application, the alarm clock application may be automatically executed at a preset time without receiving an input signal for executing the alarm clock application from a user. Therefore, an execution screen of the alarm clock application is displayed on the full-sized window 10 at the preset time and another application that has been executed is displayed on the sub-window 40.

Figure 4:
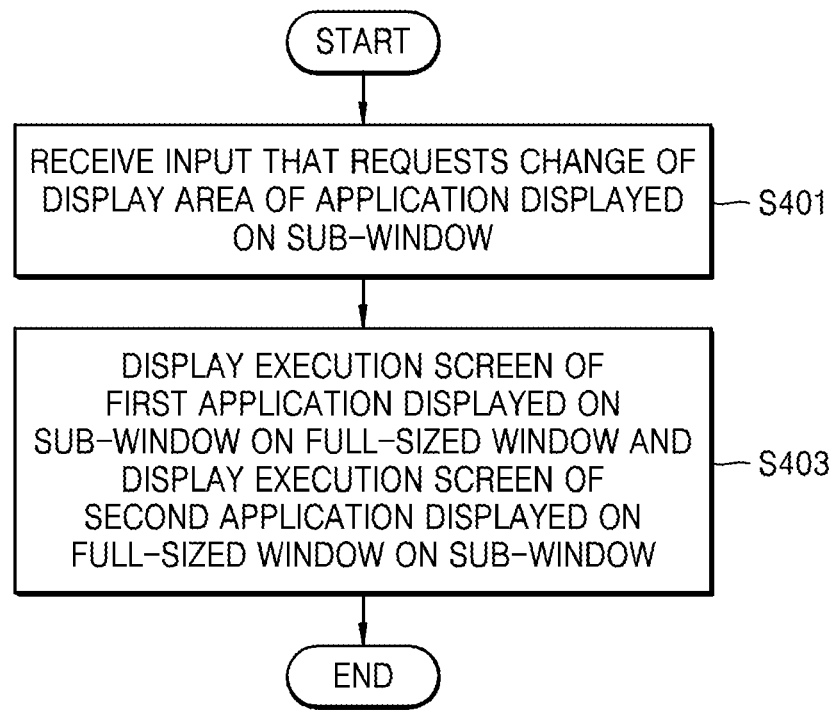
FIG. 4 is a flowchart of a method of displaying applications by changing a sub-window and a full-sized window according to an embodiment of the present disclosure.

FIG. 4 is a flowchart of a method of displaying an application by changing a sub-window and a full-sized window according to an embodiment of the present disclosure.

Referring to FIG. 4, in operation S401, the terminal device 100 may receive an input that requests a change of a display area of an execution screen of an application, which is displayed on the sub-window 111.

For example, the terminal device 100 may receive an input, which requests a change of a display area of an execution screen of an application that is displayed on the sub-window 111, from the user through an input unit.

The input unit may include a key pad, a dome switch, a touch pad (constant pressure/electrostatic types), a jog wheel, a jog switch, and a physical hardware button.

Alternatively, the terminal device 100 may detect a tapping gesture on an area of the sub-window 111 on which an execution screen of an application is displayed. The display screen 110 may include a touch screen capable of detecting user gestures. The tapping gesture on an area of the sub-window 111 may be processed as the input which requests the change of the display area of an execution screen of the application. Gestures of touching and holding, double tapping, dragging, panning, flicking, and dragging and dropping may be processed as the input which requests the change of an execution screen of the display area of the application that is displayed on the sub-window 111 according to preset information.

In operation S403, the terminal device 100 displays the execution screen of the first application on the full-sized window 112 and displays the execution screen of the second application, which has been displayed on the full-sized window 112, on the sub-window 111 in response to the input received in operation S401.

For example, the visual effect may include an effect in which the execution screen of the first application displayed on the full-sized window 112 is gradually decreased and is displayed on the sub-window 111. In addition, the visual effect may include an effect in which the execution screen of the second application displayed on the sub-window 111 is gradually increased and is displayed on the full-sized window 112. Furthermore, the visual effect may include an effect in which the execution screen of the second application gradually expands and a notification of expansion completion when the execution screen of the second application finishes expanding. For example, when the execution screen of the second application finishes expanding, a shaking effect may be applied to the window. This effect may be referred to as a split effect.

Also, the auditory effect may include an effect of outputting a 'click' sound when the execution screen of the first application is gradually decreased and then displayed on the sub-window 111 and when the execution screen of the second application is gradually increased and then displayed on the full-sized window 112.

When the execution screen of the first application, which has been displayed on the full-sized window 112, is displayed on the sub-window 111 and when the execution screen of the second application, which has been displayed on the sub-window 111, is displayed on the full-sized window 112, the user of the terminal device 100 may easily recognize that the execution screen of the first application is displayed on the sub-window 111 instead of on the full-sized window 112 and the execution screen of the second application is displayed on the full-sized window 112 instead of on the sub-window 111 based on the simultaneous output of the visual effect and the auditory effect.

The input, which is received in operation S401 and requests for a change of a display area of an execution screen of an application displayed on the sub-window 111, may control display of the application, which is displayed on the sub-window 111, such that the application is displayed on the full-sized window 112 instead of the sub-window 111. The application displayed on the sub-window 111 may not be controlled on the sub-window 111, but the execution screen of the sub-window 111 may be checked. However, the application displayed on the sub-window 111 may also be controlled according to other settings.

When used for checking an execution state of an application, the sub-window 111 is useful since the application is displayed thereon. However, since the sub-window 111 is smaller than the full-sized window 112, the sub-window 111 may not be useful for controlling the application. Therefore, an input with regard to the sub-window 111 or a gesture detected in the sub-window 111 may be processed as an input or a gesture for controlling the sub-window 111 itself rather than the application.

For example, when the application displayed on the sub-window 111 is a calculator application, an execution screen of the calculator application including an execution result of the calculator application may be displayed on the sub-window 111 according to control by the user. However, although an input for moving the sub-window 111 or adjusting a size of the sub-window 111 may be available, an input for performing a calculator function may not be available. Therefore, as the input that requests the change of the display area of the execution screen of the application is received in the sub-window 111, the user may control the application on the full-sized window 12 by displaying the execution screen of the application onto the full-sized window 112 instead of the sub-window 111.

When the first application displayed on the sub-window 111 is displayed on the full-sized window 112, the second application displayed on the full-sized window 112 may be displayed on the sub-window 111. Since the application that the user wants to control is the first application in operation S401, the second application may be displayed onto the sub-window 111 instead of on the full-sized window 112. Therefore, the second application does not disappear from the display screen 110 and may continue to be displayed on the sub-window 111.

Figure 5:
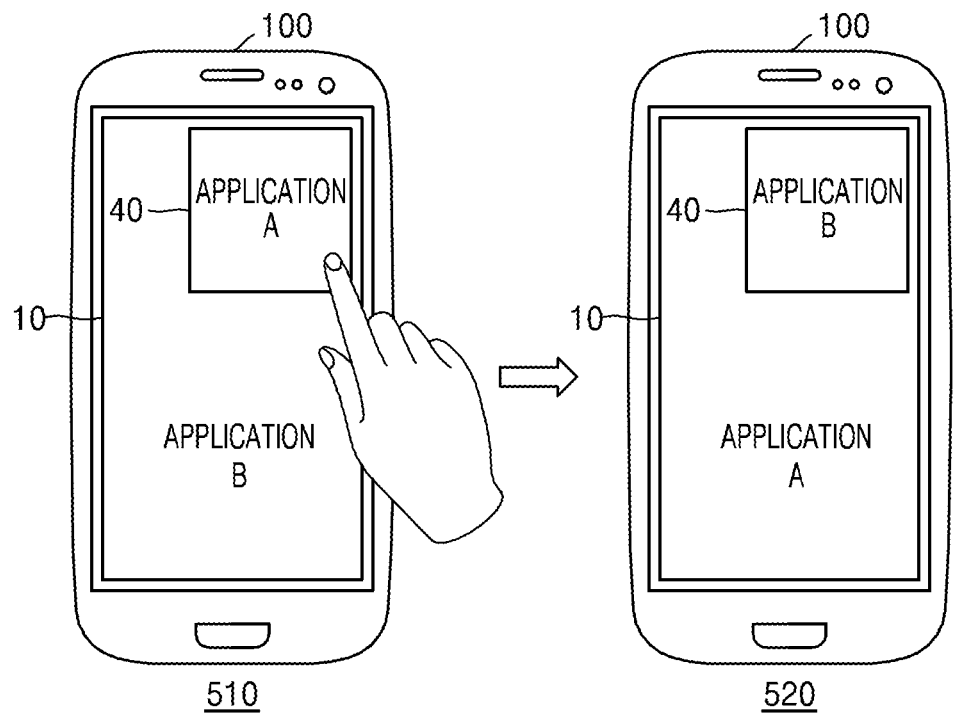
FIG. 5 illustrates a method of displaying applications by changing a sub-window and a full-sized window according to an embodiment of the present disclosure.

FIG. 5 illustrates a method of displaying applications by changing a sub-window and a full-sized window according to an embodiment of the present disclosure.

Referring to FIG. 5, an execution screen of an application A is displayed on the sub-window 40. In this case, the input that requests the change of the display area of the execution screen of the application may be received or a gesture is detected in an area where the sub-window 40 is displayed. For example, a tapping gesture of the user may be detected in the area where the sub-window 40 is displayed in display screen 510. The display screen 510 may correspond to operation S401 of FIG. 4.

On display screen 520, the execution screen of the application A displayed on the sub-window 40 may be displayed on the full-sized window 10 in response to the input. In addition, the execution screen of the application B may be displayed on the sub-window 40 in response to the input that requests the change of the display area of the execution screen of the application or the gesture. The display screen 520 may correspond to operation S403 of FIG. 4.

Figure 6:
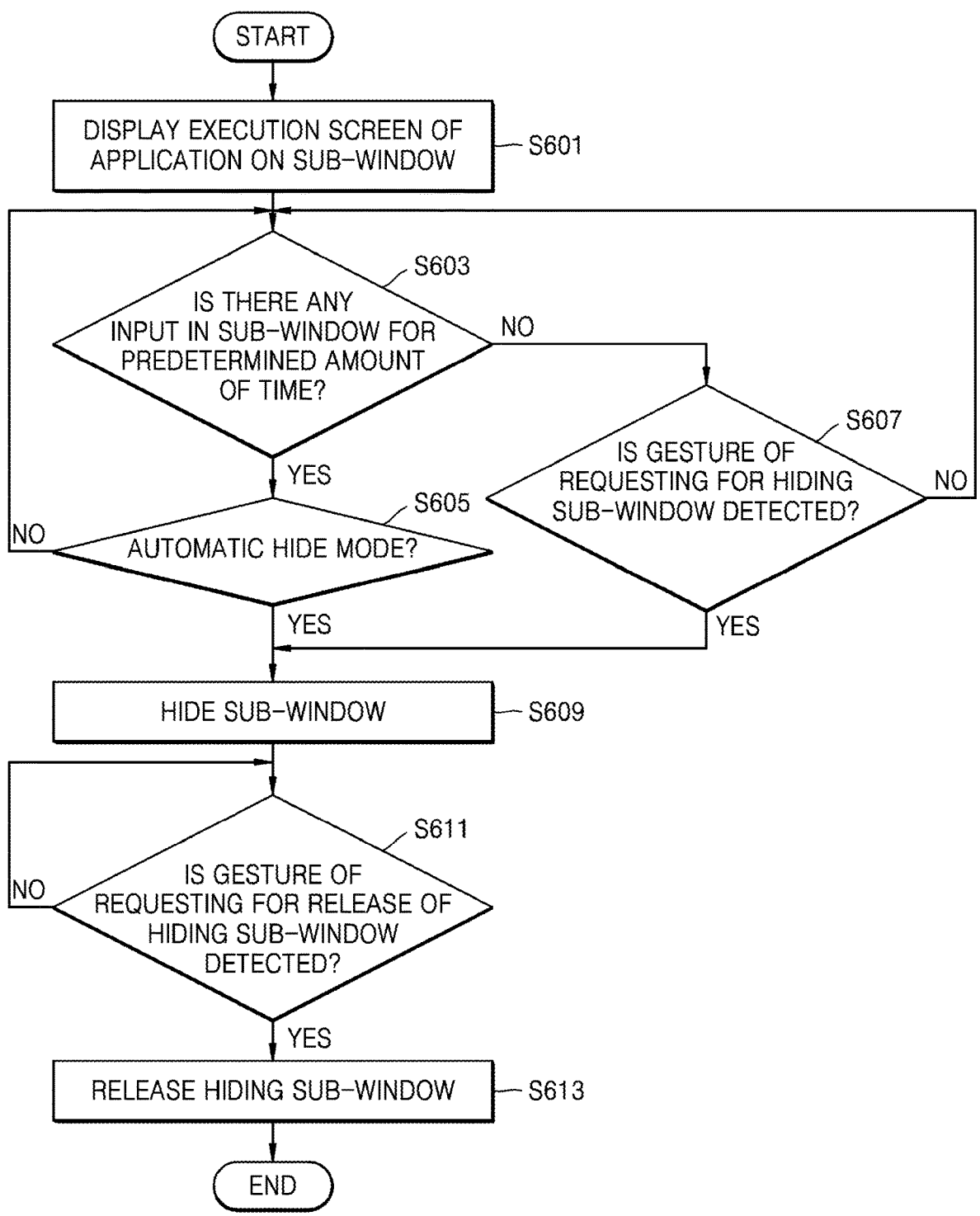
FIG. 6 is a flowchart of a method of displaying a sub-window in a hide mode according to an embodiment of the present disclosure.

FIG. 6 is a flowchart of a method of displaying a sub-window in a hide mode according to an embodiment of the present disclosure.

Referring to FIG. 6, a method is illustrated for displaying applications on the sub-window 111, and thus, the number of screens that may be displayed on the full-sized window 112 is not limited. For example, an execution screen of an application being executed in the terminal device 100 may be displayed on the full-sized window 112 other the execution screen of the application displayed on the sub-window 111. Alternatively, an application drawer screen including an icon used to display a home screen or execute an application of the terminal device 100 may be displayed on the full-sized window 112.

In the present embodiment, displaying the sub-window 111 in the hide mode may refer to when the terminal device 100 transparently displays portions of the sub-window 111 or the sub-window 111. Alternatively, displaying the sub-window 111 in the hide mode may mean that the terminal device 100 displays an alternative image. In this case, the alternative image may be much smaller than the sub-window 111.

Since the sub-window 111 overlaps the full-sized window 112, there may be an area that is displayed on the full-sized window 112 but is covered by the sub-window 111. Therefore, instead of displaying the sub-window 111, the terminal device 100 may display only some portions of the sub-window 111, display the sub-window 111 such that the sub-window 111 is transparent, or display an alternative image which is smaller than the sub-window 111 so that areas covered by the sub-window 111 are visible on the full-sized window 112.

The execution screen of the application may be displayed on the sub-window 111 in operation S601.

In operation S603, the terminal device 100 may determine whether there is an input or gesture with regard to the sub-window 111 for a predetermined amount of time or more.

When there is no input or gesture with regard to the sub-window 111 for the predetermined amount of time or more, the terminal device 100 may determine whether the sub-window 111 is set to be in the automatic hide mode in operation S605. When there is no input or gesture with regard to the sub-window 111 for the predetermined amount of time or more, the terminal device 100 may display the sub-window 111 in the automatic hide mode in operation S609 according to whether the sub-window 111 is set to be in the automatic hide mode. For example, when there is no input or gesture with regard to the sub-window 111 for the predetermined amount of time or more, the terminal device 100 may display portions of the sub-window 111 or an alternative image indicating the sub-window 111, or the sub-window 111 that is transparent is displayed on the display screen 110 in the automatic hide mode.

In an embodiment of the present disclosure, the automatic hide mode of the sub-window 111 may be set when a user input or a gesture for setting the automatic hide mode is detected. Alternatively, the automatic hide mode of the sub-window 111 may be released when a user input or a gesture for releasing the automatic hide mode is detected. For example, the automatic hide mode of the sub-window 111 may be set or released according to an input received in a configuration screen related to the sub-window 111. In another example, the automatic hide mode of the sub-window 111 may be set or released when the gesture is detected on the sub-window 111 of the display screen 110.

When the automatic hide mode of the sub-window 111 is set and there is no input or gesture for a predetermined amount of time on the sub-window 111, the sub-window 111 may be displayed in the automatic hide mode. The gesture may be a certain gesture according to settings. For example, when a certain gesture is not detected on the sub-window 111 for a predetermined amount of time according to the settings, the sub-window 111 may be displayed in the automatic hide mode.

When the automatic hide mode is released, even though there is no input or gesture on the sub-window 111 for the predetermined amount of time, the sub-window 111 may not be displayed in the automatic hide mode.

The terminal device 100 may display the sub-window 111 in the hide mode in operation S609 when the input or gesture detected in operation S603 or S607 is determined as an input or gesture that requests the sub-window 111 to be displayed in the hide mode.

For example, the gesture that requests the sub-window 111 to be displayed in the hide mode may be a dragging and dropping gesture in which the sub-window 111 is vertically or horizontally dragged and dropped.

When the sub-window 111 is in the hide mode, some portions of the sub-window 111 may be hidden and the other portions thereof may be displayed on the full-sized window 112, such as a bookmark.

On the contrary, when the input or gesture detected in operation S603 or S607 is determined as an input or gesture that does not request the sub-window 111 to be displayed in the hide mode, the terminal device 100 may perform other functions according to the detected input or gesture. Then, in operation S603, the terminal device 100 may determine whether the sub-window 111 receives an input for a predetermined amount of time.

In operation S611, the terminal device 100 may receive an input or gesture that requests a release of the hide mode of the sub-window 111. In operation S613, according to the detected input or gesture, the terminal device 100 may display the sub-window 111 by releasing the sub-window 111 from the hide mode.

FIGS. 7A to 7D illustrate methods of displaying a sub-window in a hide mode according to various embodiments of the present disclosure.

Figure 7A:
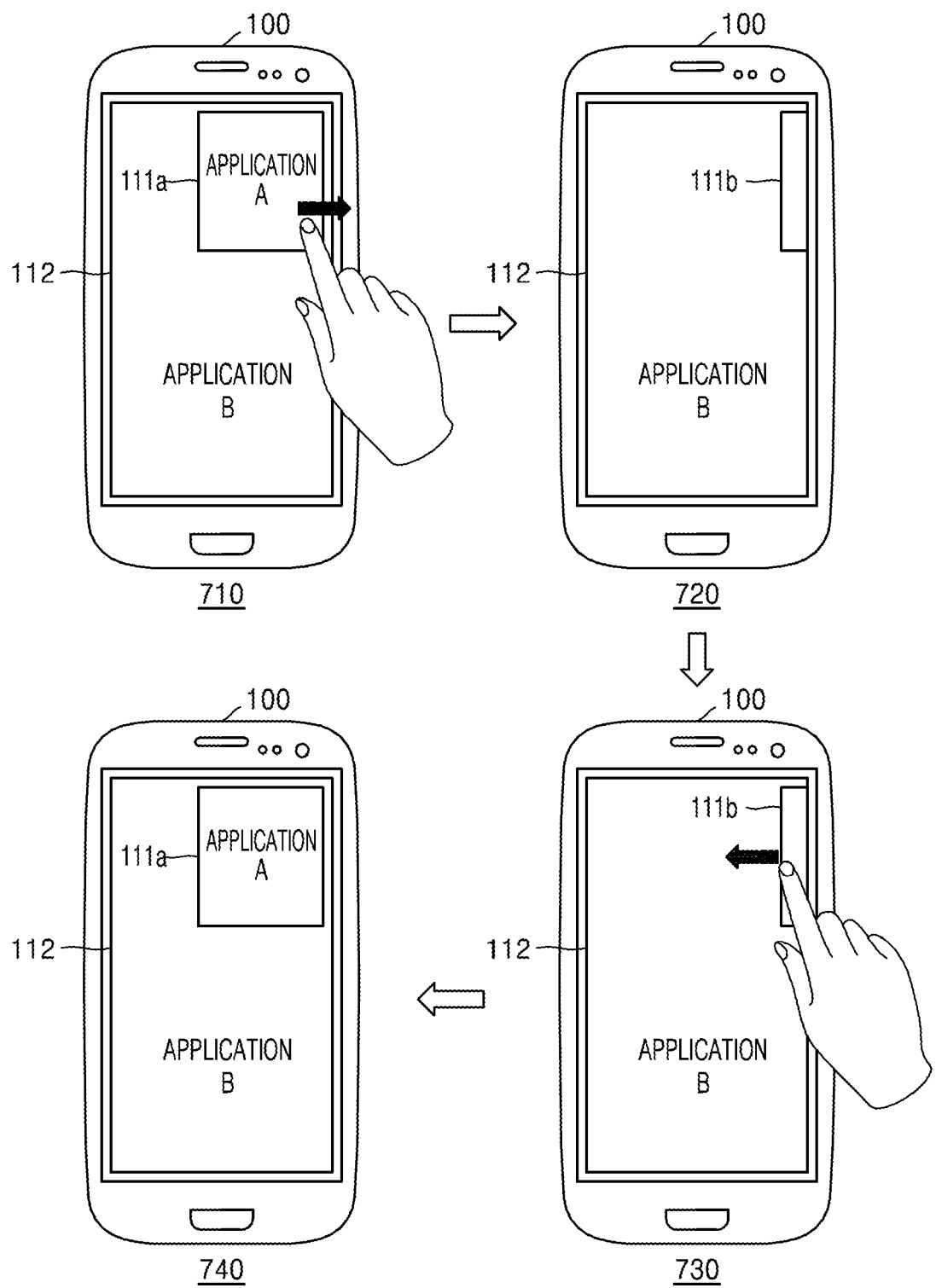
FIGS. 7A to 7D illustrate methods of displaying a sub-window in a hide mode according to various embodiments of the present disclosure.

Referring to FIG. 7A, the terminal device 100 may display the sub-window 111*a* in the hide mode when a dragging and dropping gesture in which the sub-window 111*a* is vertically and horizontally dragged and dropped is detected.

As shown in display screen 710, the terminal device 100 may detect a dragging and dropping gesture in which the sub-window 111*a* is dragged in a right direction and dropped. The display screen 710 may correspond to operation S607 of FIG. 6.

As illustrated in a display screen 720, the terminal device 100 may display a portion 111*b* of sub-window 111*a* in the hide mode in response to the detected gesture. The display screen 720 may correspond to operation S609 of FIG. 6.

Referring to display screen 730, the terminal device 100 may release the hide mode upon detecting a dragging and dropping gesture in which the sub-window 111*a* is dragged and dropped to a left side. The display screen 730 may correspond to operation S611 of FIG. 6.

Referring to a display screen 740, the terminal device 100 releases the hide mode in response to the detected gesture and may display an entire area of the sub-window 111*a*. The display screen 740 may correspond to operation S613 of FIG. 6.

Figure 7B:
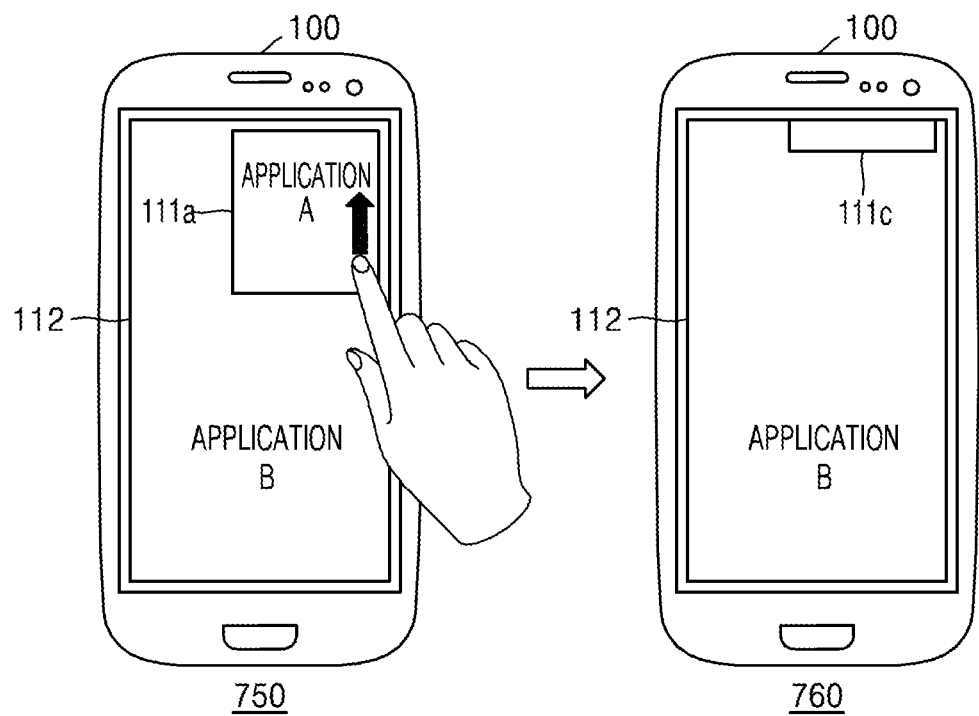

Referring to FIG. 7B, the terminal device 100 may display a portion 111*c* of the sub-window 111*a* in the hide mode by detecting a dragging and dropping gesture on the sub-window 111*a*. As shown in display screens 750 to 780, locations of the sub-window 111*a* may vary according to a dragging and dropping direction.

Referring to display screen 750, the terminal device 100 may detect a dragging and dropping gesture in which the sub-window 111a is dragged and dropped in an upward direction. The display screen 750 may correspond to operation S607 of FIG. 6.

Referring to display screen 760, the terminal device 100 may display a portion 111c of the sub-window 111a, which is in the hide mode, on an upper area of the display screen in response to the detected gesture. The display screen 760 may correspond to operation S609 of FIG. 6.

Figure 7C:
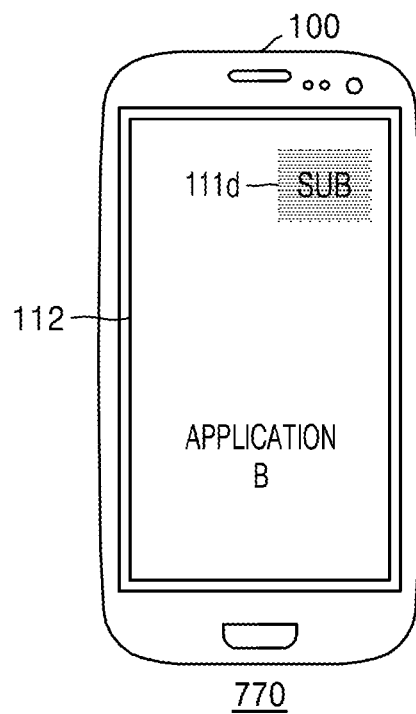
Figure 7D:
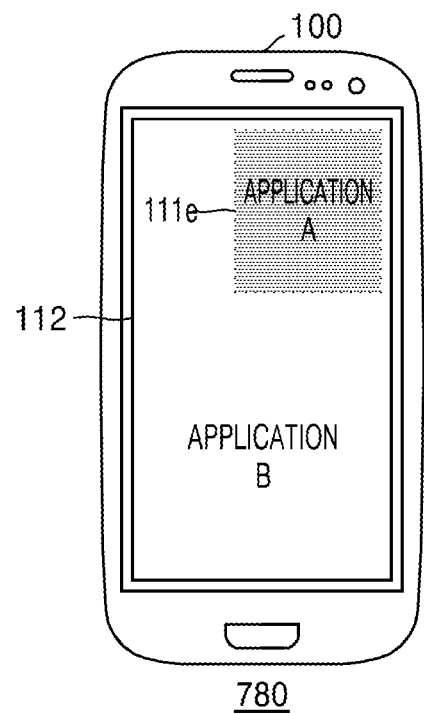

FIGS. 7C and 7D are examples of portions of sub-windows 111d and 111e displayed in the hide mode by the terminal device 100.

Referring to display screen 770, when the sub-window 111a is displayed in the hide mode, an alternative image (e.g., sub-window 111d) that is smaller than the sub-window 111 is displayed instead of the sub-window 111.

Referring to the display screen 780, when the sub-window 111 is displayed in the hide mode, the terminal device 100 may display a sub-window 111e that is transparent instead of the sub-window 111.

Figure 8:
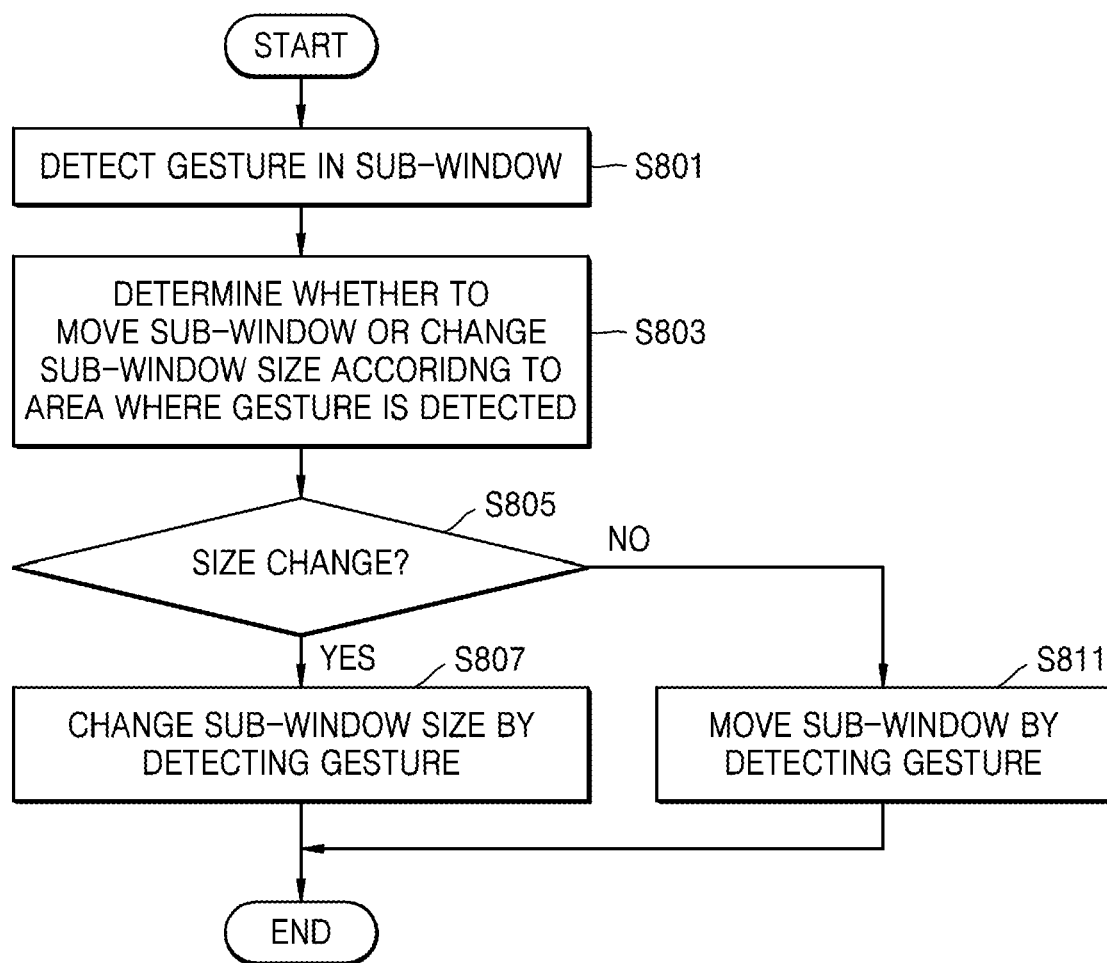
FIG. 8 is a flowchart of a method of controlling a sub-window according to areas where gestures are detected according to an embodiment of the present disclosure.

FIG. 8 is a flowchart of a method of controlling the sub-window 111 according to areas where gestures are detected according to an embodiment of the present disclosure.

Referring to FIG. 8, in operation S801, the terminal device 100 may detect a user gesture in the area where the sub-window 111 is displayed.

In operation S803, the terminal device 100 may determine whether to move the sub-window 111 or change a size of the sub-window 111 according to the area of the sub-window 111 where the gesture is detected in operation S801.

When the area of the sub-window 111 where the gesture is detected in operation S801 is not included in areas where the sub-window 111 may be moved or the size thereof may be changed, the terminal device 100 may perform operations for controlling the sub-window 111 other than moving the sub-window 111 or changing the size of the sub-window 111. For example, a color or brightness of the sub-window 111 is controlled, or volume of a sound output from an application displayed on the sub-window 111 may be controlled. As another example, when the gesture is detected, the terminal device 100 may control the color or brightness of the sub-window 111, depending on the area of the sub-window 111 where the gesture is detected. Additionally, when the gesture is detected, the terminal device 100 may control volume of sound output from an application which is displayed on the sub-window 111, depending on the area of the sub-window 111 where the gesture is detected.

Operations for controlling the sub-window 111 according to the gesture detected on the sub-window 111 are not limited to operations for moving the sub-window 111 or changing the size of the sub-window 111, and various operations for controlling the sub-window 111 according to the area of the sub-window 111 where the gesture is detected may be performed.

In operation S805, when the terminal device 100 determines to change the size of the sub-window 111 according to the area of the sub-window 111 where the gesture is detected in operation S801, the terminal device 100 may change the size of the sub-window 111 according to the detected gesture in operation S807.

In addition, in operation S805, when terminal device 100 determines to move the sub-window 111 according to the area of the sub-window 111 where the gesture is detected in operation S801, the terminal device 100 may move the sub-window 111 according to the detected gesture in operation S811.

In an embodiment of the present disclosure, when the sub-window 111 is moved according to the detected gesture, the terminal device 100 recognizes x and y values, which are a touch coordinate indicating where the gesture is detected, and may determine whether the touch coordinate of x and y values is included in a predetermined area where the sub-window 111 is moved to. For example, the predetermined area may be set as an upper area of the sub-window 111. When the touch coordinate where the gesture is detected is included an area where the sub-window 111 is moved to, the terminal device 100 may continue to track the touch coordinate where the gesture is detected. In addition, by re-setting touch coordinate of the sub-window 111 according to the tracked touch coordinate, the sub-window 111 may be moved according to the reset touch coordinate. That is, the terminal device 100 moves the sub-window 111 according to the detected gesture and then may display a movement result on the display screen 110.

Figure 9A:
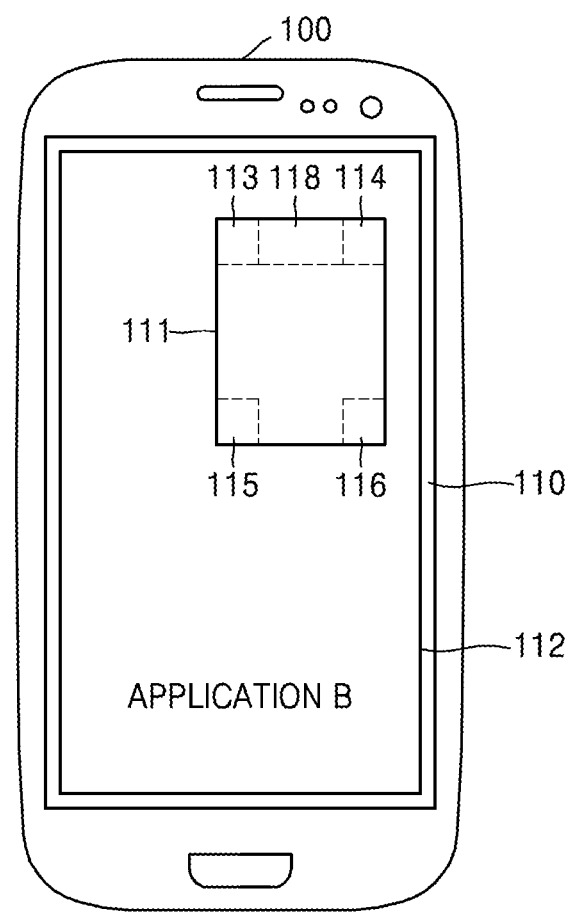

FIGS. 9A and 9B illustrate methods of controlling a sub-window according to areas where gestures are detected according to various embodiments of the present disclosure.

Referring to FIG. 9A, the sub-window 111 may be controlled according to the areas 113, 114, 115, 116, and 118 where the gestures are detected.

For example, when the gestures are detected in the areas 113, 114, 115 and 116, the size of the sub-window 111 may be adjusted according to the detected gestures. Moreover, when a gesture is detected in the area 118, the sub-window 111 may be moved according to the detected gesture.

Referring to FIG. 9B, the sub-window 111 may be moved according to gestures detected in an upper area 117 of the sub-window 111.

Referring to display screen 910, the sub-window 111 may be moved according to the gesture detected in the upper area 117 of the sub-window 111. The terminal device 100 may move the sub-window 111 to a left side of the display screen 910 according to a dragging gesture detected as a user gesture in the upper area 117 of the sub-window 111. The display screen 910 may correspond to operation S803 of FIG. 8.

Referring to display screen 920, the sub-window 111 is moved to the left side of the display screen 920 according to the detected gesture. The terminal device 100 may move the sub-window 111 to a bottom side according to a dragging gesture as long as the user gesture is still detected in the upper area 117 of the sub-window 111. The display screen 920 may correspond to operation S811 of FIG. 8.

Referring to a display screen 930, the sub-window 111 is moved to a bottom of display screen 930 according to the detected gesture. The display screen 930 may correspond to operation S811 of FIG. 8.

Figure 10A:
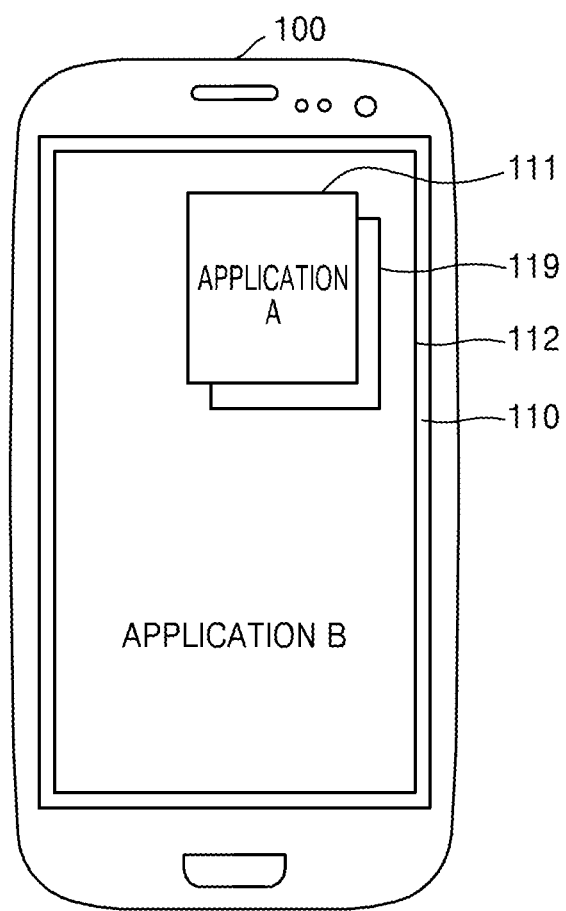
FIGS. 10A and 10B illustrate methods of displaying an application list on a sub-window according to various embodiments of the present disclosure.
Figure 10B:
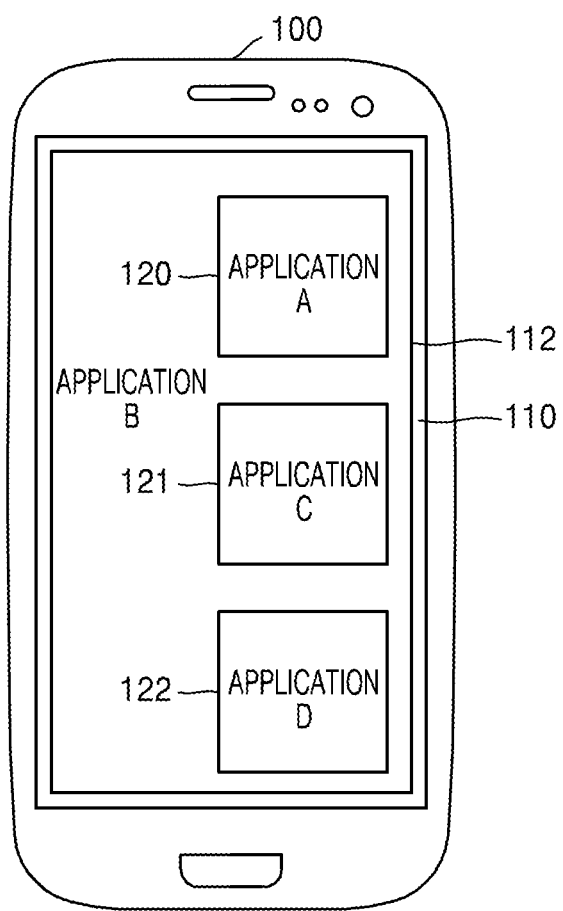

FIGS. 10A and 10B illustrate methods of displaying an application list on sub-windows according to various embodiments of the present disclosure.

Referring to FIG. 10A, the application list may be displayed on the sub-windows 111 and 119 in a stack mode.

When the sub-windows 111 and 119 are displayed in the stack mode, execution screens of applications being executed in the terminal device 100 may be displayed on the sub-windows 111 and 119 which overlap in a predetermined order. For example, the sub-windows 111 and 119, on which the execution screens of the applications being executed in the terminal device 100 are displayed, may be displayed and overlap according to an execution order of the applications or a requested display order of the applications. The terminal device 100 may display at least one of the sub-windows 111 and 119 according to the number of applications being executed in the terminal device 100.

When the sub-windows 111 and 119 are displayed in the stack mode and a new application, which is a second application, is executed, an execution screen of the second application is displayed on a full-sized window and the first application, which has been displayed on the full-sized window, may be displayed on the sub-windows 111 and 119. In other words, the execution screen of the first application may be displayed on a foremost sub-window from among the sub-windows 111 and 119.

In an embodiment of the present disclosure, the execution screens of the applications may be sequentially displayed in an order of the foremost sub-window, a second sub-window, etc., from among the sub-windows 111 and 119.

Referring to FIG. 10B, an application list including sub-windows 120, 121 and 122 may be displayed in a list mode.

When the application list is displayed in the list mode, execution screens of applications being executed in the terminal device 100 may be displayed on the sub-windows 120, 121 and 122 according to a predetermined order. For example, the sub-windows 120, 121 and 122, on which the execution screens of the applications being executed in the terminal device 100 are displayed, may be displayed in an order in which the applications are executed or a requested display order of the applications.

When the sub-windows 120, 121 and 122 are displayed in the list mode and a new application, which is the second application, is executed, an execution screen of the second application is displayed on a full-sized window, and an execution screen of the first application, which has been displayed on the full-sized window 112, may be displayed on a topmost sub-window from among the sub-windows 120, 121 and 122. In other words, the execution screen of the first application may be displayed on the topmost sub-window from among the sub-windows 120, 121 and 122.

According to an embodiment, the execution screens of the applications may be sequentially displayed in an order of the topmost sub-window, a second sub-window, etc., from among the sub-windows 120, 121 and 122.

Figure 11:
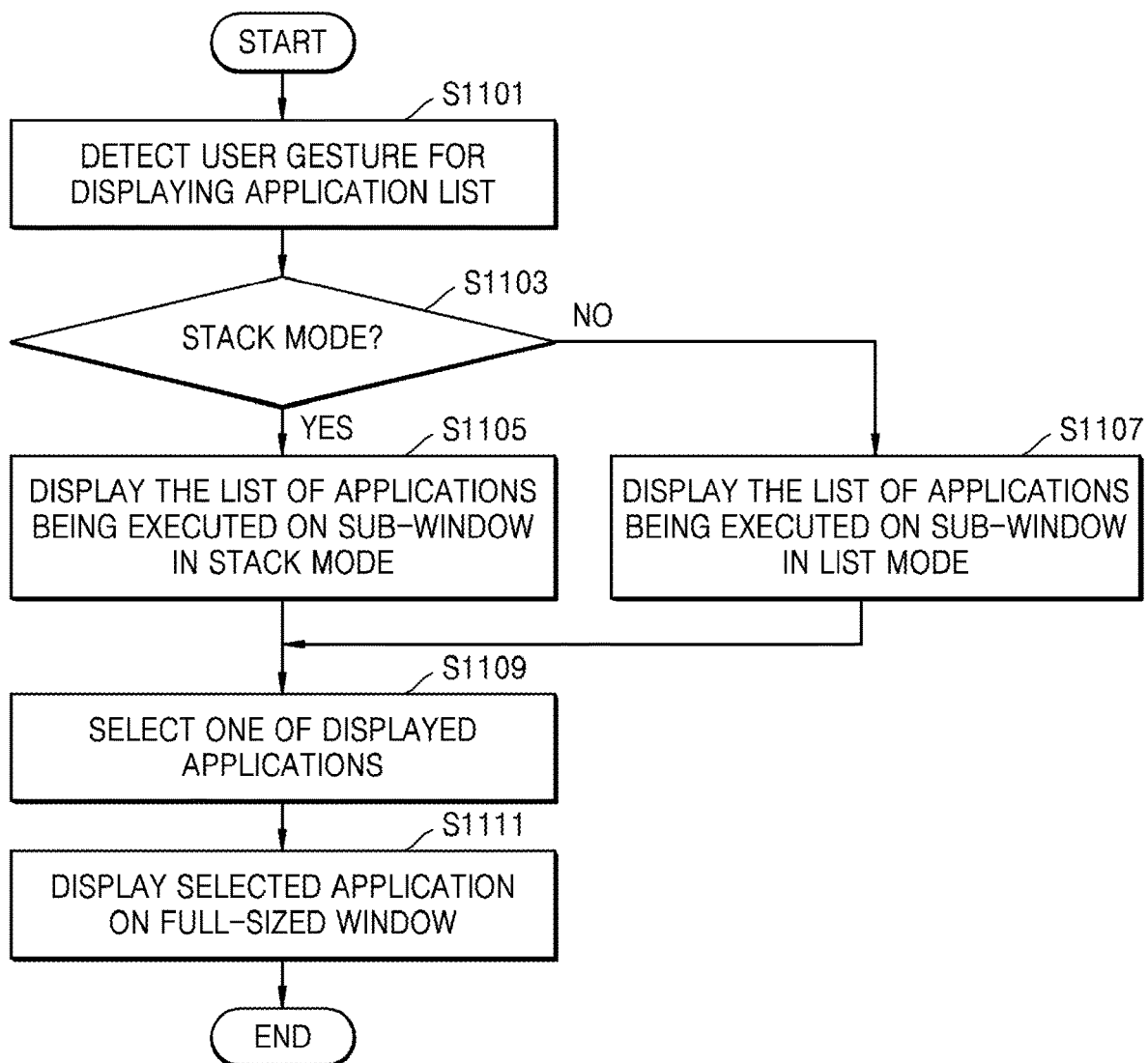
FIG. 11 is a flowchart of a method of displaying an application list on a sub-window according to an embodiment of the present disclosure.

FIG. 11 is a flowchart of a method of displaying an application list on a sub-window according to an embodiment of the present disclosure.

Referring to FIG. 11, the terminal device 100 may detect a gesture for requesting a display of the application list on the sub-window 111 or may receive an input in operation S1101.

In operation S1103, the terminal device 100 may determine whether to display the sub-window 111 in the stack mode or the list mode according to the gesture detected or the input received in operation S1101. For example, the gesture that may be detected in operation S1101 may be a double tapping gesture where the sub-window 111 is displayed.

The terminal device 100 may determine whether to display the sub-window 111 in the stack mode or the list mode according to a preset list displaying mode. In the present embodiment, the list displaying mode indicates a method of displaying a list of the sub-window 111 and may include, for example, the stack mode and the list mode.

The method of displaying the list of the sub-window 111 is not limited thereto, and the sub-window 111 may be variously displayed.

When the terminal device 100 determines the list displaying mode of the sub-window 111 as the stack mode in operation S1103, the terminal device 100 may display the application list of the applications being executed on one or more sub-windows in the stack mode in operation S1105. The sub-windows may overlap and be displayed on the full-sized window 112.

In addition, when the terminal device 100 determines the list displaying mode of the sub-window 111 as the list mode in operation S1107, the terminal device 100 may display the application list of the applications being executed on one or more sub-windows in the list mode. The sub-windows may be displayed on the full-sized window 112.

When one application is selected from a list of the displayed applications in operation S1109, the terminal device 100 may display the application selected in operation S1109 on the full-sized window 112. When there is an application displayed on the full-sized window 112 prior to operation S1111, an execution screen of the application may be displayed on the sub-window 111 instead of the full-sized window 112 in operation S1111.

Operations S1109 and S1111 of FIG. 11 may correspond to operations S401 and S403 of FIG. 4, respectively. That is, when an application is selected from the list of the applications displayed on the sub-window 111, it may be considered that the selected application is displayed on the full-sized window 112. Therefore, the application selected in operation S1109 may be displayed on the full-sized window 112.

Figure 12:
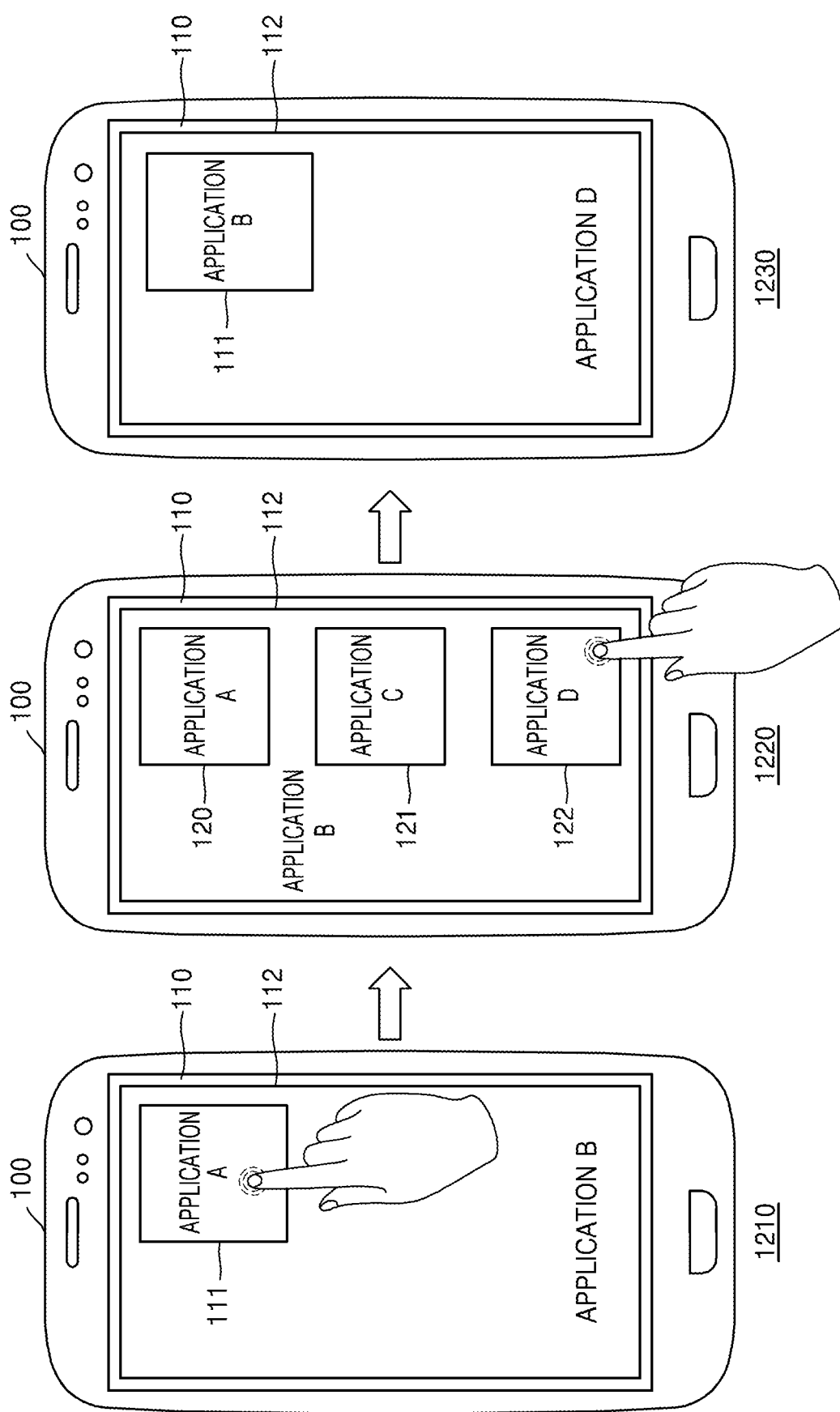
FIG. 12 illustrates examples of displaying an application list on a sub-window in a list mode according to an embodiment of the present disclosure.

FIG. 12 illustrates examples of displaying the application list on the sub-window 111 in the list mode according to an embodiment of the present disclosure.

Referring to FIG. 12, the terminal device 100 may display a display screen 1210 and may then detect a gesture or receive an input for requesting the display of the list of the sub-window 111 on the sub-window 111. For example, the terminal device 100 may detect a double tapping gesture on the sub-window 111. The display screen 1210 may correspond to operation S1101 of FIG. 11.

Referring to display screen 1220, the terminal device 100 may display applications A, C and D being executed in the terminal device 100 on the sub-windows 120, 121 and 122 in the list mode. The display screen 1220 may correspond to operation S1107 of FIG. 11.

Referring to display screen 1230, the terminal device 100 may display an execution screen of the application, which is selected from the applications displayed on the sub-windows 120, 121 and 122, on the full-sized window 112. For example, when a tapping gesture of the user is detected on the sub-window 122 where the application D is displayed, the terminal device 100 may display the application D on the full-sized window 112. In addition, the terminal device 100 may display the application D on the full-sized window 112 instead of on the sub-window 111. The display screen 1230 may correspond to operation S1111 of FIG. 11.

Also, the display screen 1230 may correspond to operation S403 of FIG. 4. That is, when an application is selected from the list of the applications displayed on the sub-windows 120, 121 and 122, the selected application may be displayed on the full-sized window 112.

The displaying the application list in the stack mode will be described below with reference to FIGS. 14A and 14B.

Figure 13:
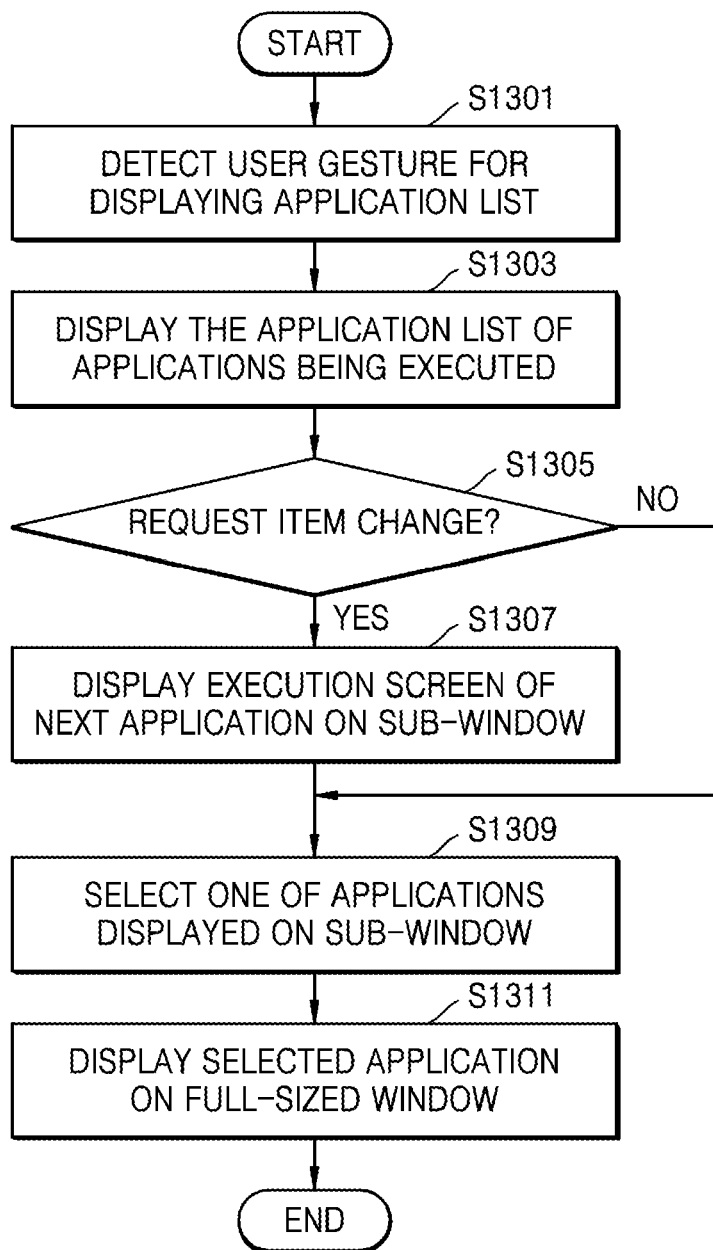
FIG. 13 is a flowchart of a method of changing a list item in a sub-window according to an embodiment of the present disclosure.

FIG. 13 is a flowchart of a method of converting a list item in a sub-window according to an embodiment of the present disclosure.

Referring to FIG. 13, in operation S1301, the terminal device 100 may detect a gesture or receive an input for requesting the display of the list of the sub-window 111.

In operation S1303, the terminal device 100 may display the list of applications being executed in response to the received input or the detected gesture.

In operation S1303, the sub-window 111 may be displayed in the stack mode, the list mode, or another mode according to a predetermined list displaying mode. Alternatively, the list of the sub-window 111 may be displayed in a list displaying mode other than the stack mode according to the received input or the detected gesture. For example, the sub-window 111 may be displayed in different modes according to the detected gesture.

In operation S1305, the terminal device 100 may receive a request for changing items of the list of the sub-window 111.

In an embodiment of the present disclosure, the items of the list of the sub-window 111 may indicate respective sub-windows configuring the list of the sub-window 111.

For example, the gesture for requesting a change of the items may be detected in an area where the sub-window 111 is displayed. The gesture for requesting the change of the items may be a dragging and dropping gesture for vertically and horizontally dragging and dropping the sub-window 111 in the area where the sub-window 111 is displayed.

In operation S1307, the terminal device 100 may display a sub-window including an execution screen of a next application according to the gesture received in operation S1305. Therefore, the terminal device 100 may sequentially display sub-windows according to the gesture for requesting the change of the items.

In an embodiment of the present disclosure, the execution order of the applications may be an order in which the applications are executed in the terminal device 100 or a requested display order of the applications screens of the applications.

When the sub-windows are displayed in the stack mode, the terminal device 100 may sequentially change the foremost sub-window, which is displayed in the stack mode, to another sub-window according to the gesture received in operation S1305. When the list of the sub-windows is displayed in the stack mode, the foremost sub-window may be displayed. In the case of other sub-windows, some portions thereof may be displayed. In another example, the display order of the sub-windows may be changed so that the second sub-window, which overlaps the foremost sub-window, may be set as the foremost sub-window from among the sub-windows, and the foremost sub-window may be set as the backmost sub-window from among the sub-windows, according to the gesture received in operation S1305.

When the list of the sub-windows is displayed in the stack mode, the terminal device 100 may display an animation showing an operation via which the foremost sub-window is sent to the backmost sub-window among the other sub-window, according to the detection of gestures. Therefore, it may be easily identified that the foremost sub-window changes to be displayed as the last sub-window.

Also, when the list of the sub-windows is displayed, the terminal device 100 may sequentially display the sub-windows according to the gesture received in operation S1305. For example, the sub-windows may be sequentially displayed according to a scrolling gesture detected in a list area of the sub-windows. When the list of the sub-windows is displayed in the list mode, entire portions of the sub-windows may be displayed according to sizes of the sub-windows or a size of the display screen 110. Other sub-windows may not be displayed or some portions thereof may be displayed on the display screen 110.

When an application is selected from the application list in operation S1309, the terminal device 100 may display an execution screen of the selected application on the full-sized window 112 in operation S1309. When there is an execution screen of an application displayed on the full-sized window 112 prior to operation S1311, the execution screen of the application displayed on the full-sized window 112 prior to operation S1311 may be displayed on the sub-window instead of the full-sized window 112 in operation S1311.

Operations S1309 and S1311 of FIG. 13 may correspond to operations S401 and S403 of FIG. 4. That is, when one sub-window is selected from the list of the sub-window 111, an execution screen of an application, which was displayed on the selected sub-window, may be displayed on the full-sized window 112 instead of the selected sub-window. Therefore, the execution screen of the application selected in operation S1309 may be displayed on the full-sized window 112 instead of the sub-window 111.

When the list of the sub-windows is displayed, the terminal device 100 may move at least one sub-window included in the list of the sub-window 111 as described above with reference to FIGS. 8 to 9B. For example, when a gesture with regard to some areas of the sub-window is detected while the list of the sub-windows is displayed, the terminal device 100 may move the sub-windows in the list according to the detected gesture. An area where a gesture for requesting for moving the sub-windows may be detected in the stack mode may be an upper portion of the foremost sub-window displayed among the sub-windows. Also, an area where a gesture for requesting for moving the sub-windows may be detected in the list mode may be an upper portion of each sub-window.

The movement of the sub-windows in the list will be described below with reference to FIGS. 16 and 17.

FIGS. 14A, 14B, 15A, and 15B are examples of methods of displaying an application list in a stack mode on a sub-window according to various embodiments of the present disclosure.

Figure 14A:
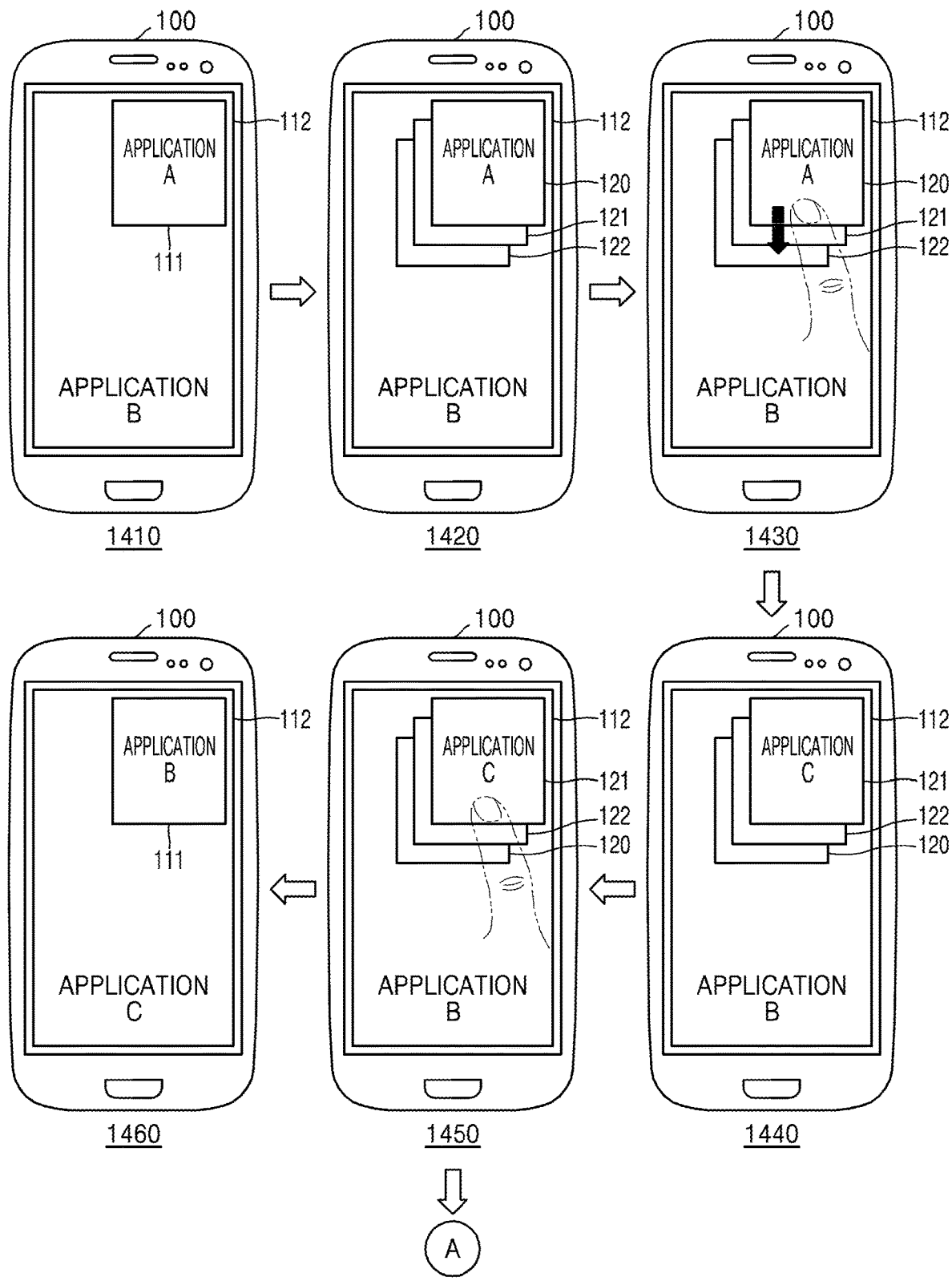
FIGS. 14A, 14B, 15A, and 15B are examples of methods of displaying an application list in a stack mode on a sub-window according to various embodiments of the present disclosure.
Figure 14B:
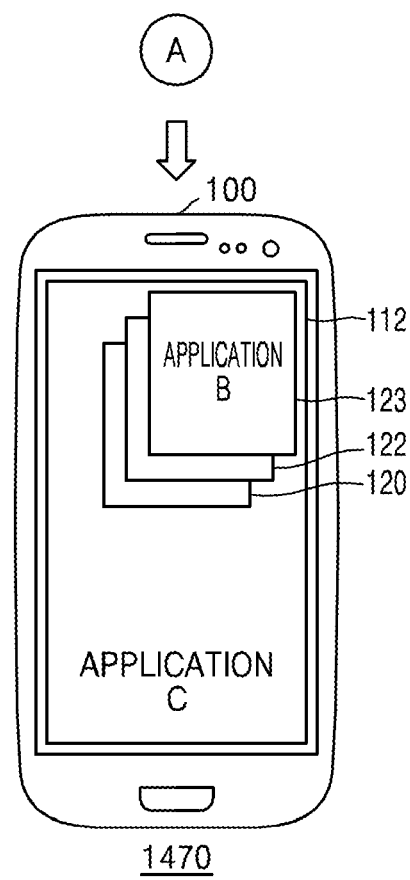

Referring to FIGS. 14A and 14B, display screens 1410 to 1470 illustrate that sub-windows are displayed based on the method of displaying the list of the sub-windows in the stack mode.

Referring to display screen 1410, the execution screens of the applications A and B are displayed on the sub-window 111 and the full-sized window 112, respectively. The terminal device 100 may detect a gesture for requesting the display of the list of the sub-windows in the area where the sub-window 111 is displayed. For example, the gesture for requesting the display of the list of the sub-windows may be a double tapping gesture. The display screen 1410 may correspond to operation S1301 of FIG. 13.

Referring to display screen 1420, the terminal device 100 may display the list of the sub-windows, in which execution screens of the applications being executed are displayed, in response to the detected gesture. In detail, the sub-windows 120, 121 and 122 including the execution screens of the applications A, C and D may overlap and be displayed. The display screen 1420 may correspond to operation S1303 of FIG. 13.

Referring to display screen 1430, the terminal device 100 may detect a gesture for requesting a change of the foremost sub-window of the list of the sub-windows 120, 121 and 122. In this case, the gesture may be a dragging and dropping gesture in which an area where the sub-window 120 is displayed is dragged and dropped in a downward direction.

In more detail, requesting a change of the foremost sub-window of the list of the sub-windows 120, 121 and 122 may be the same as a request for changing the foremost sub-window to another sub-window in the list of the sub-windows. The display screen 1430 may correspond to operation S1305 of FIG. 13.

Referring to display screen 1440, the sub-window 121 including an execution screen of a next application according to the detected gesture may be displayed. In detail, when a next application, that is, an application to be executed after the application A is executed is the application C, the sub-window 121 including an execution screen of the application C may be displayed on the foremost sub-window among the sub-windows 120, 121 and 122.

In addition, the sub-window 120 including an execution screen of the application A that is displayed on the foremost window is disposed on a backmost sub-window among the list of the sub-windows 120, 121 and 122 and may be partially displayed. The display screen 1440 may correspond to operation S1307 of FIG. 13.

Referring to display screen 1450, the terminal device 100 may select one application from the displayed application list in order to display an execution screen of the selected application on the full-sized window 112. For example, the terminal device 100 may detect a gesture for selecting an application. The gesture may be a tapping gesture of tapping a portion of the sub-window 121 on which the execution screen of the application is displayed. The display screen 1450 may correspond to operation S1309 of FIG. 13.

Referring to display screen 1460, the terminal device 100 may display the execution screen of the application selected on the display screen 1450 on the full-sized window 112. The execution screen of the application B, which has been displayed on the full-sized window 112, may be displayed on the sub-window 111 instead of the full-sized window 112. The display screen 1460 may correspond to operation S1311 of FIG. 13.

The display screens 1450 and 1460 may correspond to operations S401 and S403 of FIG. 4. That is, a gesture for selecting an application may be a gesture for displaying the execution screen of the application on the full-sized window 112 instead of the sub-window 111.

Referring to display screen 1470, the terminal device 100 may display the execution screen of the application selected in the display screen 1450 on the full-sized window 112 instead of the sub-window 111. The execution screen of the application B, which has been displayed on the full-sized window 112, is displayed on a sub-window 123 and, unlike in the display screen 1460, the sub-window 123 is included in the list of the sub-windows 120, 122 and 123 which is displayed in the stack mode. Since the application B is the most recently executed application among applications displayed on the sub-windows 120, 122 and 123, the sub-window 123 on which the execution screen of the application B is displayed may be disposed at the forefront of the list. The display screen 1470 may correspond to operation S1311 of FIG. 13.

Figure 15A:
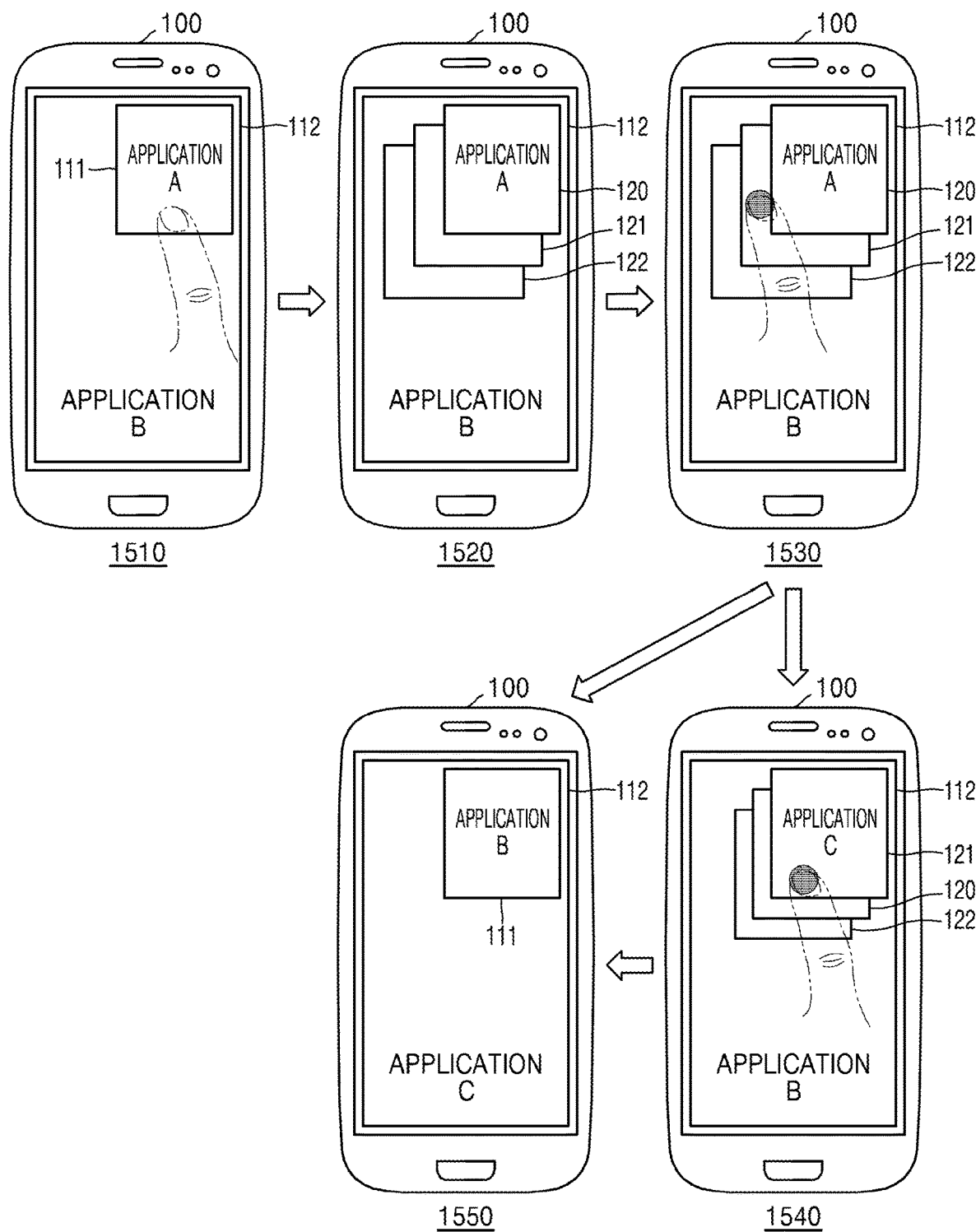

Referring to FIG. 15A, display screens 1510 to 1550 are illustrated on which sub-windows are displayed based on the method of displaying the application list. The order of the sub-windows of the application list may be changed by a method different from the method of FIGS. 14A and 14B.

Referring to display screen 1510, execution screens of applications A and B are displayed on a sub-window 111 and a full-sized window 112, respectively, and the terminal device 100 may detect a gesture for requesting a display of the list of the sub-windows. The display screen 1510 may correspond to operation S1301 of FIG. 13.

Referring to display screen 1520, the terminal device 100 may display the application list of the sub-windows, on which the execution screens applications being executed are displayed, in the stack mode in response to the detected gesture. In detail, sub-windows 120, 121 and 122 including execution screens of applications A, C and D may overlap and be displayed. The display screen 1520 may correspond to operation S1303 of FIG. 13.

Referring to display screen 1530, a gesture for changing an order of the sub-windows may be detected in an area where at least one of the sub-windows 120, 121 and 122 is displayed. In other words, a gesture for moving the selected sub-window to the forefront of the application list may be detected. For example, a tapping gesture for tapping an area where the sub-window 121 is displayed to move the sub-window 121 to the forefront of the application list may be detected. The display screen 1530 may correspond to operation S1303 of FIG. 13.

Referring to display screen 1530, a gesture for displaying the execution screen of the application C onto the full-sized window 112 instead of the sub-window 121 may be detected in an area where the sub-window 121 is displayed. For example, a tapping gesture for tapping an area where the sub-window 121 is displayed to display the execution screen of the application C onto the full-sized window 112 instead of the sub-window 121 may be detected.

Referring to display screen 1540, as a result of selecting the sub-window 121, the sub-window 121 where the execution screen of the application C is displayed is disposed at the forefront of the application list and may be displayed. Then, a user gesture for displaying the sub-window 122, which is disposed at the forefront of the application list, on the full-sized window 112 may be detected. The gesture may be a tapping gesture for tapping the area where the sub-window 121 is displayed. The display screen 1540 may correspond to operation S1309 of FIG. 13.

Referring to display screen 1550, the terminal device 100 may display the execution screen of the application selected on the display screen 1530 or 1540 on the full-sized window 112. The sub-window 121 that is selected on the display screen 1530 may be directly display on the full-sized window 112 instead of being displayed at the forefront of the application list as shown in the display screen 1540. The execution screen of the application B displayed on the full-sized window 112 may be displayed on the sub-window 111. The display screen 1550 may correspond to operation S1311 of FIG. 13.

The display screens 1530, 1540 and 1550 may correspond to operations S401 through S403 of FIG. 4, respectively. That is, a gesture for selecting an application may be a gesture for changing the display area of the application from the sub-window 111 to the full-sized window 112.

Figure 15B:
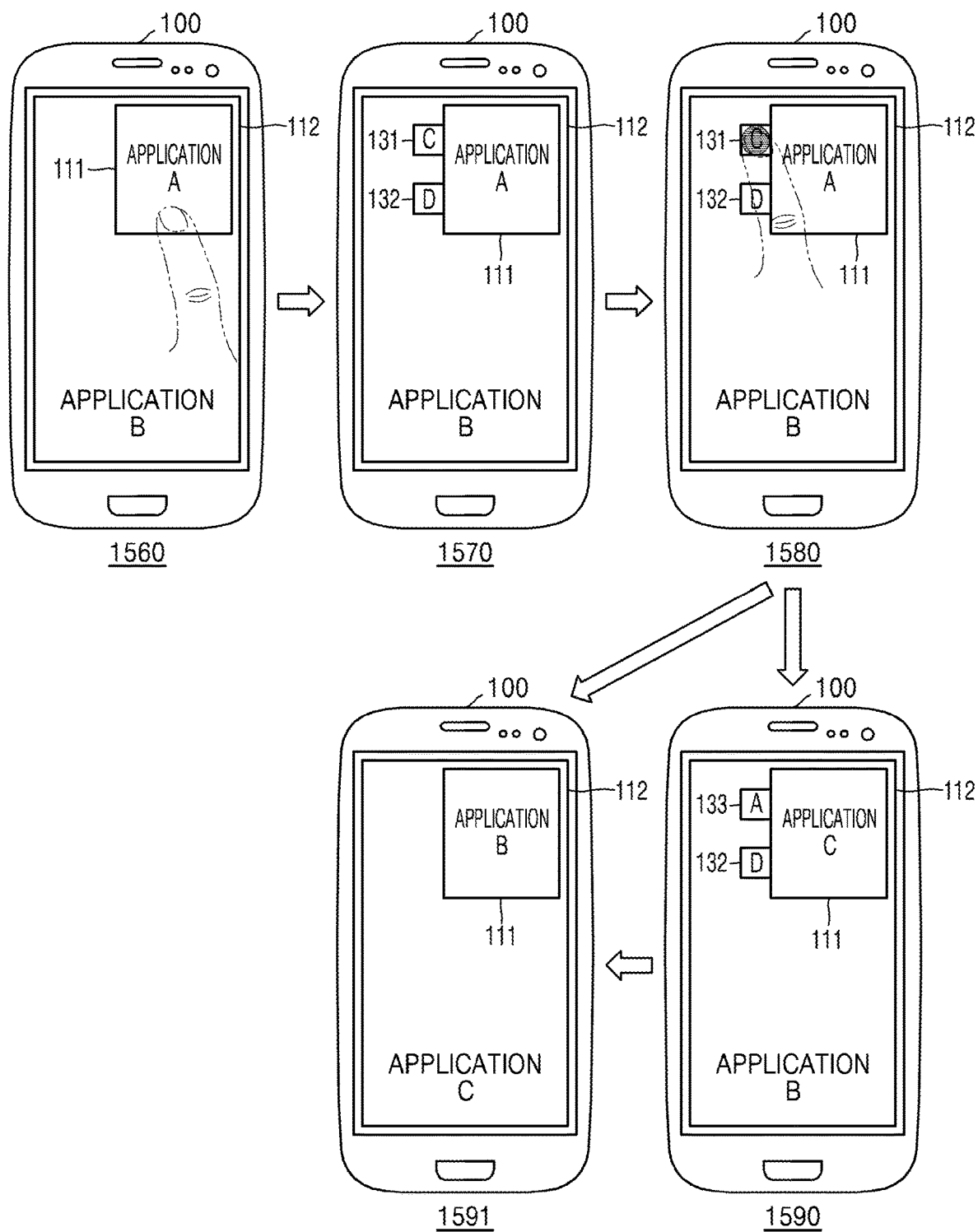

Referring to FIG. 15B, examples of display screens displaying a sub-window 111 in a mode other than the stack mode or the list mode are illustrated. A list displaying mode of the sub-window 111 will be referred to as a bookmark mode.

Referring to display screen 1560, execution screens of applications A and B are respectively displayed on the sub-window 111 and the full-sized window 112, and the terminal device 100 may detect a gesture for requesting the display of the application list of the sub-window 111. The display screen 1560 may correspond to operation S1301 of FIG. 13.

Referring to display screen 1570, the terminal device 100 may display the application list on which applications, which are being executed, are displayed in the bookmark mode in response to the detected gesture. In detail, alternative images 131 and 132, which indicate that the applications C and D are being executed other than the application A, may be displayed on a side of the sub-window 111 like bookmarks. The display screen 1570 may correspond to operation S1303 of FIG. 13.

Referring to display screen 1580, the terminal device 100 may detect a gesture for displaying an execution screen of an application selected from among the application C and D on the sub-window 111 instead of displaying the execution screen of application A on areas where the alternative images 131 and 132 are displayed. For example, a tapping gesture for tapping the areas where the alternative images 131 and 132 are displayed.

Otherwise, referring to the display screen 1580, the terminal device 100 may detect a gesture for displaying an execution screen of an application, which is selected from among the application C and D, on the full-sized sub-window 111 instead of displaying the execution screen of application A on areas where the alternative images 131 and 132 are displayed. For example, a tapping gesture for tapping the areas where the alternative images 131 and 132 are displayed.

Referring to display screen 1590, as a result of selecting the alternative image 131, the alternative image 131 that indicates the execution screen application C may be displayed on the sub-window 111. When a user gesture for displaying the execution screen of the application C, which has been displayed on the sub-window 111, on the full-sized window 112 may be detected, the terminal device 100 displays the execution screen of the application C onto the full-sized window 112 instead of the sub-window 111, on display screen 1591. The gesture may be a tapping gesture for tapping an area of the sub-window 111 where the execution screen of the application C is displayed. The display screen 1590 may correspond to operation S1309 of FIG. 13.

Referring to the display screen 1591, the terminal device 100 may display the execution screen of the application selected on display screens 1580 or 1590 on the full-sized window 112. That is, an application C which corresponds to the alternative image 131 selected on the display screen 1580 may be directly displayed on the full-sized window 112 instead of displaying an entire portion of the sub-window 111, as shown in the display screen 1590. The execution screen of the application B may be displayed on the sub-window 111 instead of the full-sized window 112, on display screen 1591. The display screen 1591 may correspond to operation S1311 of FIG. 13.

The display screens 1580 and 1591 may correspond to operations S401 and S403 of FIG. 4. That is, a gesture for selecting an application may be a gesture for displaying the execution of the application onto the full-sized window 112 instead of the sub-window 111.

Figure 16:
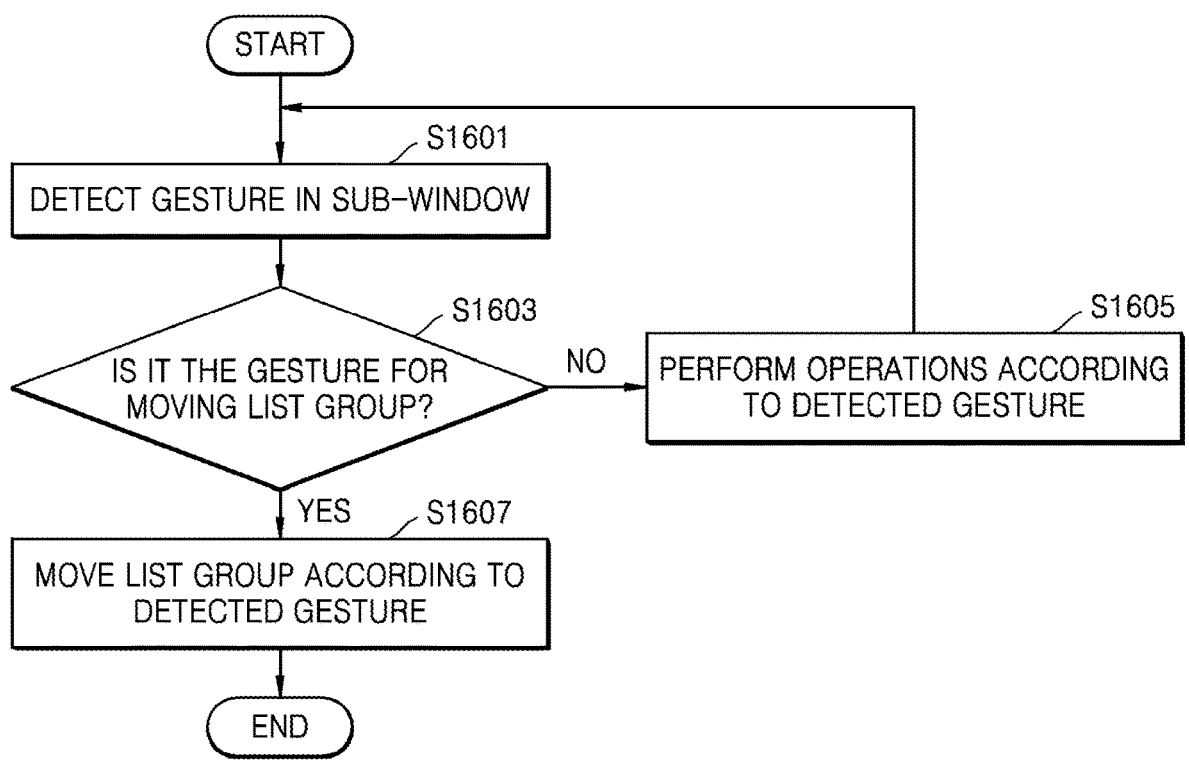
FIG. 16 is a flowchart of a method of moving a list group of sub-windows according to an embodiment of the present disclosure.

FIG. 16 is a flowchart of a method of moving a list group of sub-windows according to an embodiment of the present disclosure.

Referring to FIG. 16, the list group of the sub-windows may indicate the list of the sub-windows including one or more sub-windows. In the present embodiment, when the list of the sub-windows is moved, the sub-windows are moved together. The list of the sub-windows will be referred to as the list group of the sub-windows.

In operation S1601, the terminal device 100 may detect a gesture in areas where the sub-windows are displayed.

In operation S1603, the terminal device 100 may determine whether the gesture detected in operation S1601 is for moving the list group of the sub-windows.

The list group may be in the stack mode or the list mode, but are not limited thereto. The list group of the sub-windows may be displayed in various modes, and the list group of the sub-windows may be moved according to the detected gesture.

When the list group of the sub-windows are moved according to the detected gesture, the terminal device 100 recognizes values of x and y, which are a touch coordinate indicating where the gesture is detected, and may determine whether the values are the same as x and y values of a center of a predetermined area in the sub-window 111 where the list group of the sub-windows is moved to.

When the list group of the sub-windows is displayed in the stack mode, the areas for the movement of the list group of the sub-windows may be determined as an upper area of the sub-window disposed at the forefront.

When the list group of the sub-windows is displayed in the list mode, the areas for the movement of the sub-windows may be determined as upper areas of one or more sub-windows displayed on a display screen.

When the gesture detected in operation S1601 is not used in the areas for the movement of the sub-windows, the terminal device 100 may perform a preset task in operation S1605. The preset task may be performed according to gestures and may be a task other than the movement of the sub-windows. For example, when the gesture is detected in one of the areas for adjusting the size of a sub-window, and not in one of the areas for the movement of the sub-window, the terminal device 100 may adjust the size of the sub-window according to the detected gesture.

In operation S1607, the terminal device 100 may move the list group according to the detected gestures.

When the touch coordinate where the gesture is detected is an area for the movement of the sub-window 111, the terminal device 100 may continue to track the touch coordinate of the gesture. The terminal device 100 resets coordinates of the list group including sub-windows 120, 121 and 122 according to the recognized touch coordinate and may re-indicate locations of the list group including sub-windows 120, 121 and 122 according to the re-set coordinates. That is, the terminal device 100 moves the list group including sub-windows 120, 121 and 122 according to the detected gesture and may display movement results.

Figure 17:
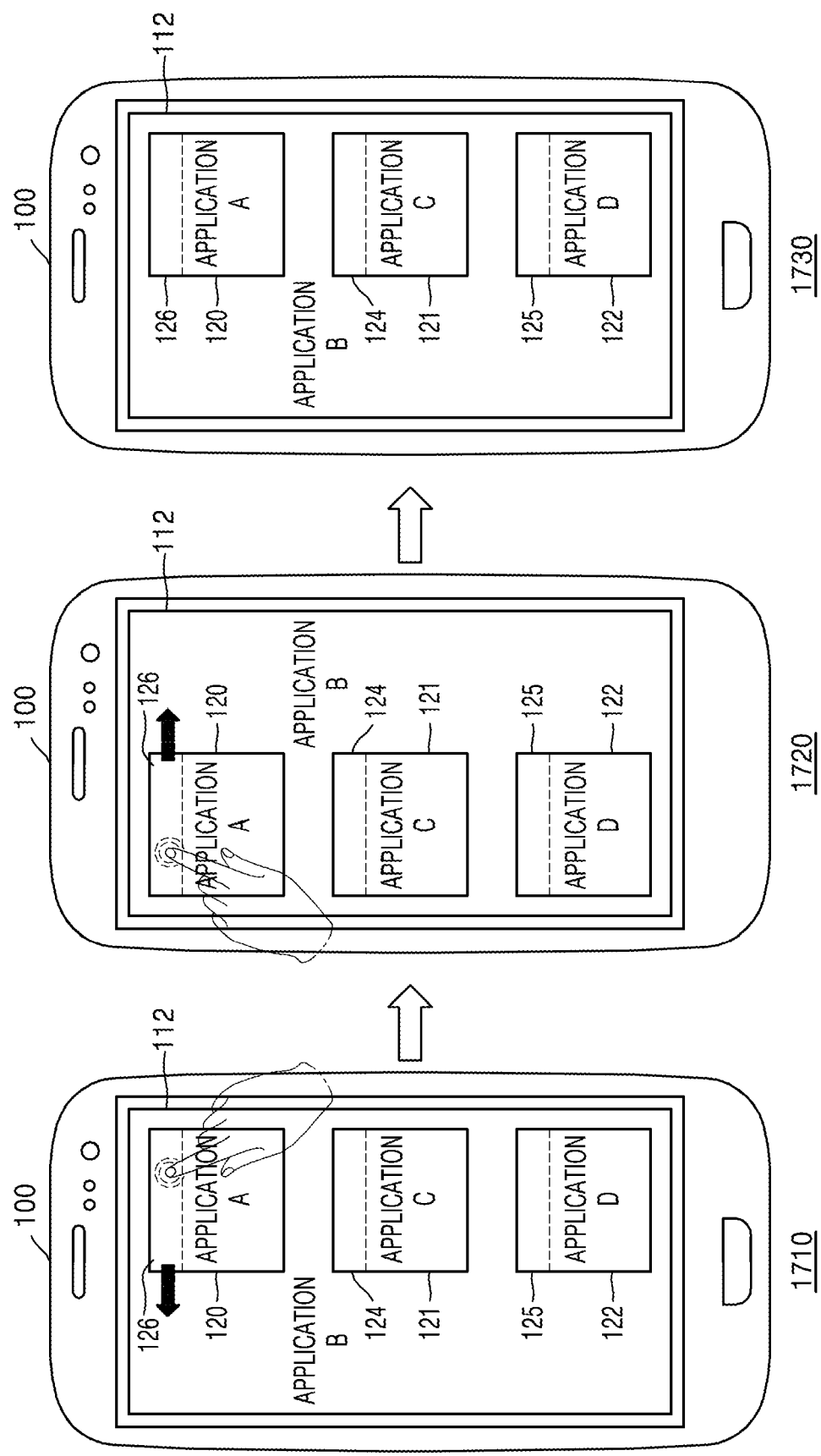
FIG. 17 illustrates examples of moving a list group of sub-windows displayed in a list mode according to an embodiment of the present disclosure.

FIG. 17 illustrates examples of moving a list group of sub-windows displayed in a list mode according to an embodiment of the present disclosure.

Referring to FIG. 17, the terminal device 100 displays a display screen 1710 and detects a gesture in an area where the sub-window 120 is displayed and may determine whether the detected gesture is input in the areas 126. When it is determined that the detected gesture is input in the areas 126 for the movement of the list group including sub-windows 120, 121 and 122, the terminal device 100 may move the list group including sub-windows 120, 121 and 122 according to the detected gesture. For example, the areas for the movement of the list group including sub-windows 120, 121 and 122 displayed in the list mode may be set as areas 124, 125, and 126 of upper portions of the sub-windows displayed on the display screen 110. The display screen 1710 may correspond to operation S1603 of FIG. 16.

Referring to display screen 1720, the list group including sub-windows 120, 121 and 122 is moved to a left side according to the detected gesture. The display screen 1720 may correspond to operation S1607 of FIG. 16. In addition, the terminal device 100 may move the list group including sub-windows 120, 121 and 122 to a right side according to the detected gesture.

Referring to display screen 1730, the list group including sub-windows 120, 121 and 122 is moved to the right side according to the detected gesture. The display screen 1730 may correspond to operation S1607 of FIG. 16.

Figure 18:
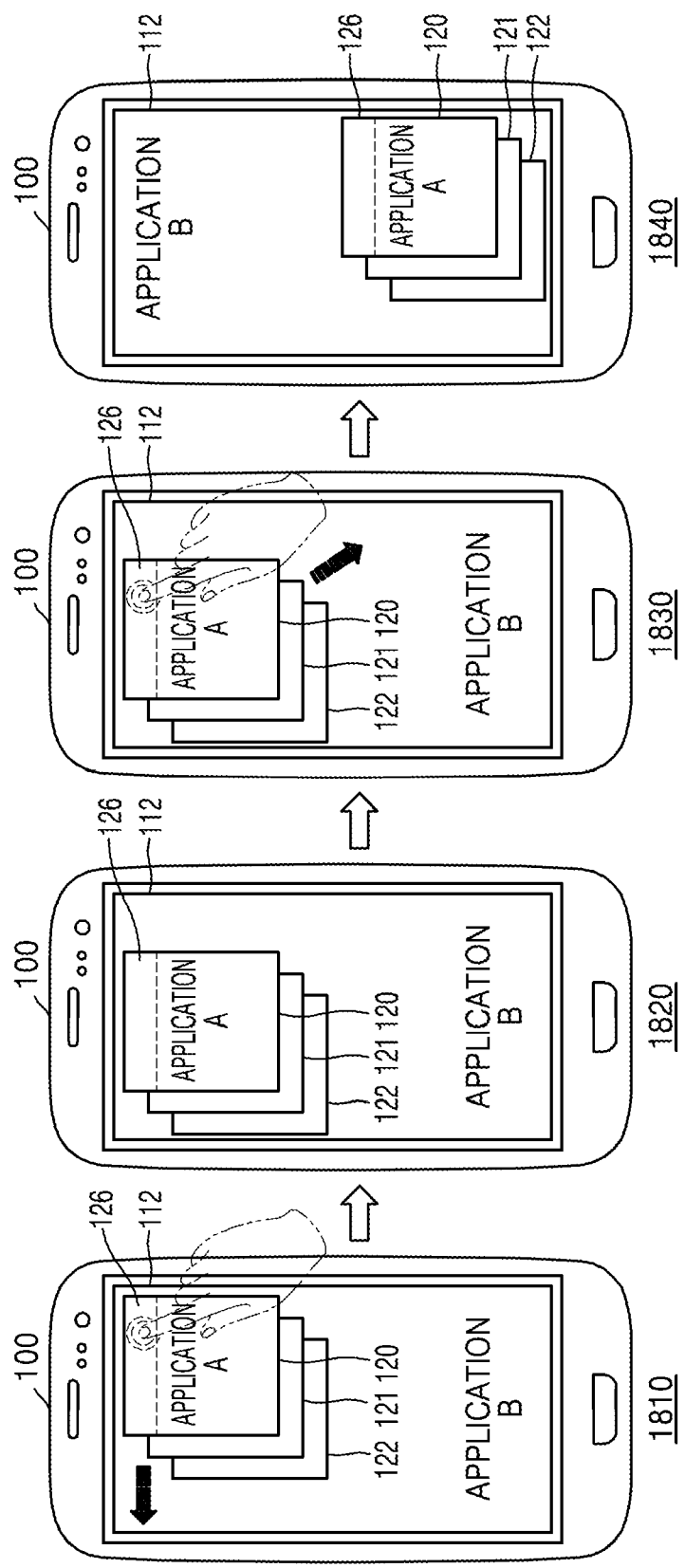
FIG. 18 illustrates examples of moving a list group of sub-windows displayed in a stack mode according to an embodiment of the present disclosure.

FIG. 18 illustrates examples of moving a list group of sub-windows displayed in the stack mode according to an embodiment of the present disclosure.

Referring to FIG. 18, the terminal device 100 displays a display screen 1810 and detects a gesture in an area where the sub-windows 120, 121 and 122 are displayed and may determine whether the detected gesture is input in an area 126 for the movement of the list group including sub-windows 120, 121 and 122. When it is determined that the detected gesture is input in the area 126 for the movement of the list group including sub-windows 120, 121 and 122, the terminal device 100 may move the list group including sub-windows 120, 121 and 122 according to the detected gesture. For example, an area for the movement of the list group including sub-windows 120, 121 and 122 displayed in the stack mode may be set as the area 126 of upper portions of the sub-window 120. The display screen 1810 may correspond to operation S1603 of FIG. 16.

Referring to display screen 1820, the list group including sub-windows 120, 121 and 122 is moved to a left side according to the detected gesture. The display screen 1820 may correspond to operation S1607 of FIG. 16.

Referring to display screen 1830, the terminal device 100 may move the list group including sub-windows 120, 121 and 122 to a lower right side. The display screen 1830 may correspond to operation S1603 of FIG. 16.

Referring to display screen 1840, the list group including sub-windows 120, 121 and 122 is moved to the lower right side. The display screen 1840 may correspond to operation S1607 of FIG. 16.

Figure 19:
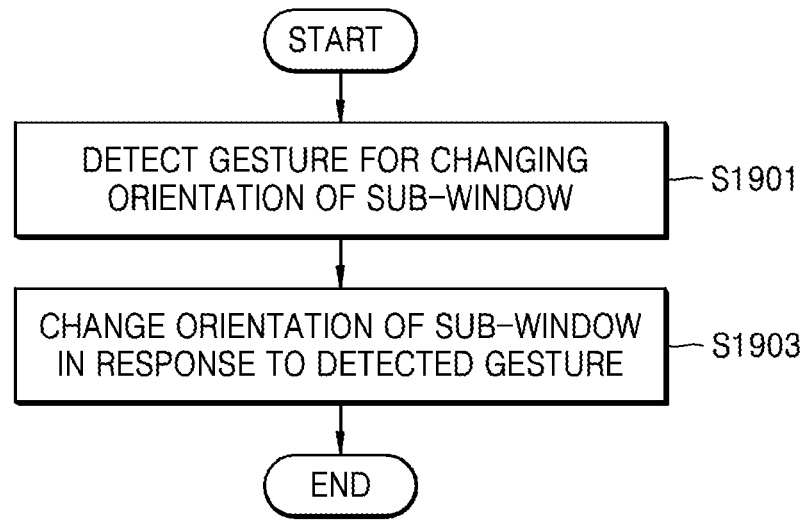
FIG. 19 is a flowchart of a method of changing an orientation of a sub-window according to an embodiment of the present disclosure.

FIG. 19 is a flowchart of a method of changing an orientation of a sub-window according to an embodiment of the present disclosure.

Referring to FIG. 19, the terminal device 100 may detect a gesture for changing the orientation of the sub-window 111 in operation S1901. For example, a dragging and dropping gesture may be detected in the sub-window 111 in which the orientation is to be changed. Alternatively, a tilt of the terminal device 100 may be detected by a gravity sensor in the orientation to be changed. When the orientation of the sub-window 111 is changed according to the tilt thereof, an additional gesture, for example, a touching and holding gesture in which the sub-window 111 is touched and held, may be set to be distinguished from a change of an orientation of the full-sized window 112. For example, when the tilt is detected by the gravity sensor, the orientation of the sub-window 111 is changed according to the touching and holding gesture detected in the sub-window 111.

In operation S1903, the terminal device 100 may change the orientation of the sub-window 111 in response to the detected gesture.

In an embodiment of the present disclosure, since the orientation of the sub-window 111 may be changed in response to the detected gesture, the orientation of the sub-window 111 may be changed without changing the physical orientation of the terminal device 100.

Figure 20:
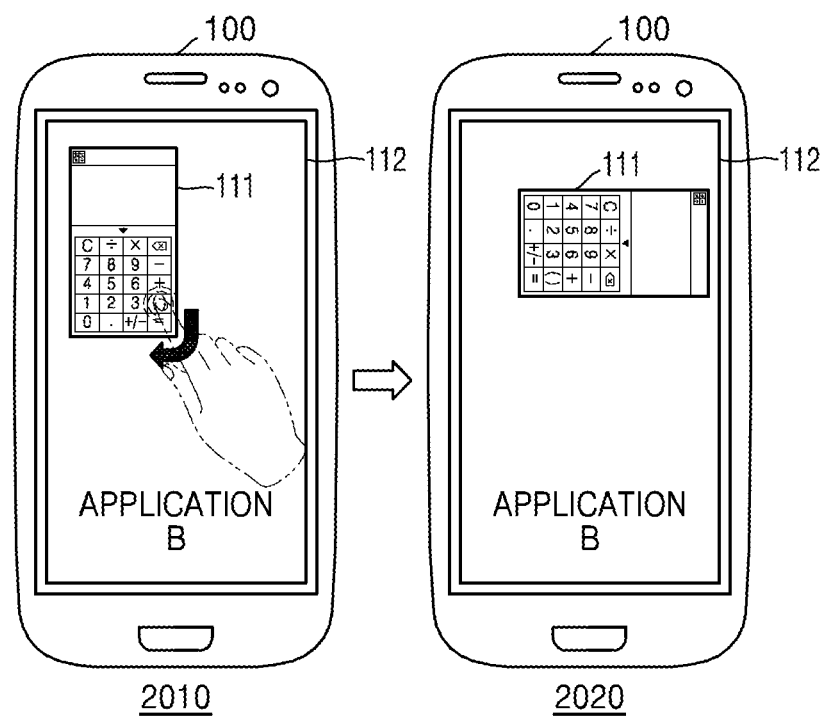
FIG. 20 illustrates an example of a method of changing an orientation of a sub-window according to an embodiment of the present disclosure.

FIG. 20 illustrates a method of changing an orientation of a sub-window according to an embodiment of the present disclosure.

Referring to FIG. 20, the terminal device 100 displays a display screen 2010 and may detect a gesture for changing an orientation of the sub-window 111. For example, a dragging and dropping gesture may be detected in the sub-window 111 in which the orientation of the sub-window 111 is to be changed. The display screen 2010 may correspond to operation S1901 of FIG. 19.

Referring to display screen 2020, the terminal device 100 may change the orientation of the sub-window 111 in response to the detected gesture. The orientation of the sub-window 111 is changed in a clockwise direction according to the detected gesture. The display screen 2020 may correspond to operation S1903 of FIG. 19.

Figure 21:
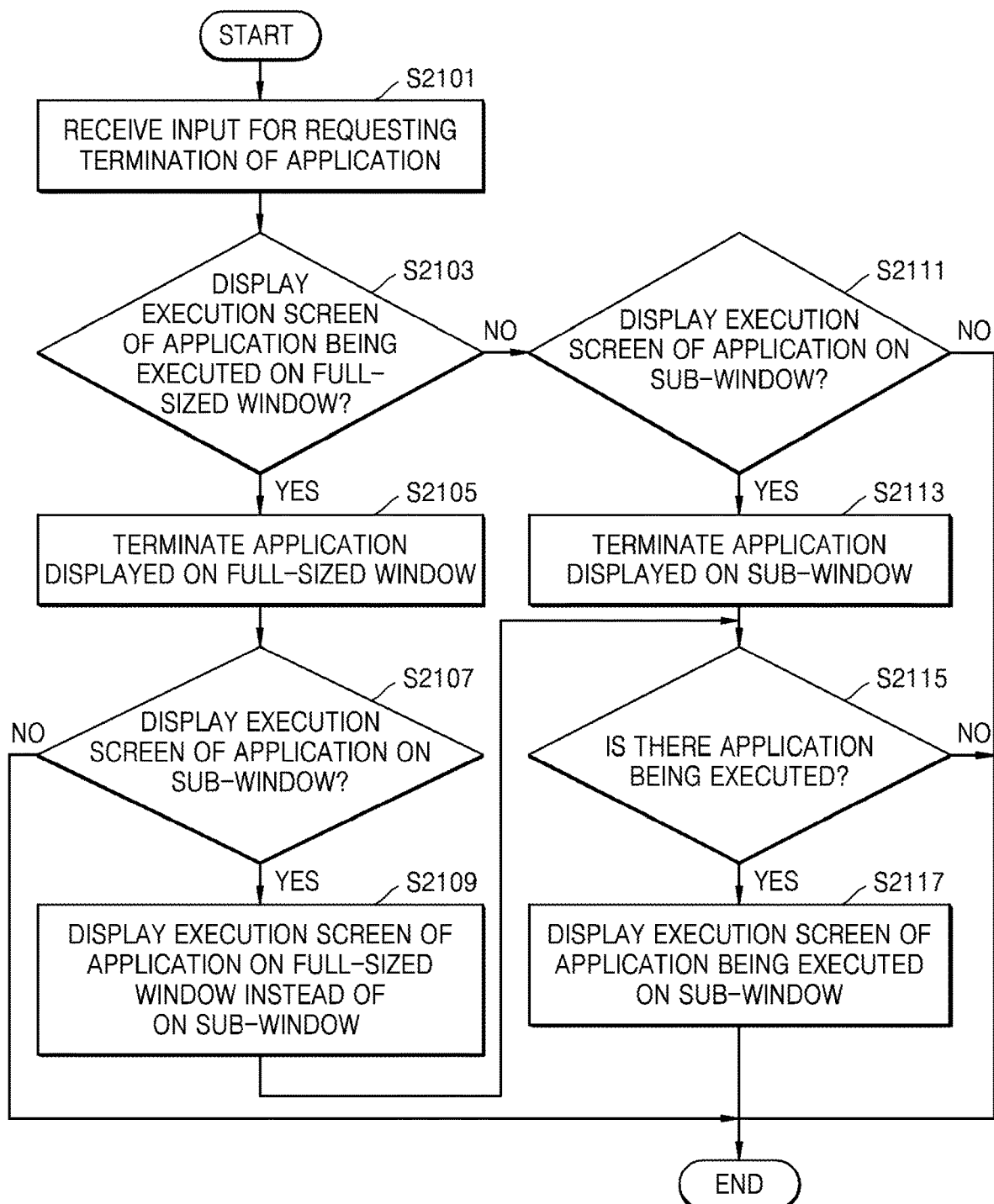
FIG. 21 is a flowchart of a method of displaying applications when terminating the applications according to an embodiment of the present disclosure.

FIG. 21 is a flowchart of a method of displaying applications when terminating the applications according to an embodiment of the present disclosure.

Referring to FIG. 21, in operation S2101, the terminal device 100 may receive an input for requesting termination of the applications. Alternatively, the terminal device 100 may detect a gesture for requesting the termination of the applications. For example, the terminal device 100 may receive an input by a termination button of the terminal device 100.

In operation S2103, the terminal device 100 may determine whether an execution screen of a recently executed application is displayed on the full-sized window 112.

In an embodiment of the present disclosure, since the application that is recently executed or for which a display request is received may be displayed on the full-sized window 112, when there is an application displayed on the full-sized window 112, the terminal device 100 may terminate the application that is displayed on the full-sized window 112 first. That is, the application that is recently executed or for which a display request is received may be terminated first by the terminal device 100 according to a termination request.

In operation S2105, when an execution screen of an application being executed is displayed on the full-sized window 112, the terminal device 100 may terminate the application displayed on the full-sized window 112.

In operation S2107, the terminal device 100 may determine whether there is an application displayed on the sub-window 111 after the application displayed on the full-sized window 112 is terminated.

In operation S2107, when it is determined that there is no application displayed on the sub-window 111 after the application displayed on the full-sized window 112 is terminated, the terminal device 100 may determine that there is no application to be displayed on the full-sized window 112 after the application displayed on the full-sized window 112 is terminated. Therefore, the terminal device 100 may display an initial screen of the terminal device 100, for example, a home screen or an application drawer screen on the full-sized window 112.

When there is an application displayed on the sub-window 111, the terminal device may display an execution screen of the application displayed on the sub-window 111 on the full-sized window 112 instead of the sub-window 111.

In addition, in the stack mode, when the list of sub-windows is displayed instead of the sub-window 111 in operation S2109, an execution screen of a foremost application of the list may be displayed on the full-sized window 112 after the application displayed on the full-sized window 112 is terminated. In addition, in the list mode, an execution screen of an uppermost application may be displayed on the full-sized window 112 after the application displayed on the full-sized window 112 is terminated.

In operation S2115, after the application displayed on the full-sized window 112 is terminated, the terminal device 100 may determine whether there is an application being executed in the terminal device 100 other than the application displayed on the full-sized window 112 in operation S2109. The determination of the terminal device 100 is made to determine whether there is an application to be displayed on the sub-window 111 because the application, which was displayed on the sub-window 111, is being displayed on the full-sized window 112.

When the list of sub-windows is displayed instead of the sub-window 111 in operation S2115, sub-windows, on which other applications except for the terminated application are displayed, may be displayed according to a preset list displaying mode, for example, the stack mode or the list mode.

When it is determined that there is no application being executed in the terminal device 100 and which may be displayed on the sub-window 111, in operation S2115, the terminal device 100 may display the full-sized window 112 without the sub-window 111.

When it is determined that there is an application being executed in the terminal device 100 and which may be displayed on the sub-window 111, in operation 52117, the terminal device 100 may display an execution screen of the application, which is determined in operation S2115 as being executed, on the sub-window 111.

When it is determined that the execution screen of the application which is being executed is not displayed on the full-sized window 112 in operation S2103, the terminal device 100 may determine in operation S2111 whether the execution screen of the application, which is being executed in the terminal device 100, is displayed on the sub-window 111.

Therefore, the terminal device 100 may terminate the application displayed on the sub-window 111 when there is no application displayed on the full-sized window 112 according to the termination request received in operation S2101.

In operation S2111, when the execution screen of the application being executed is not displayed on the sub-window 111, the terminal device 100 may determine that there is no application to be terminated and may end a process according to the termination request.

In operation S2113, when it is determined that the execution screen of the application being executed in the terminal device 100 is displayed on the sub-window 111, the terminal device 100 may terminate the application displayed on the sub-window 111.

Moreover, in the stack mode, when the list of sub-windows is displayed instead of the sub-window 111 in operation S2113, the terminal device 100 may terminate the foremost application of the list. In addition, in the list mode, the terminal device 100 may terminate the topmost application of the list.

In addition, in operation S2115, the terminal device 100 may determine whether there is an application being executed in the terminal device 100 other than the application terminated in operation S2113. The determination of the terminal device 100 is made to determine whether there is an application to be displayed on the sub-window 111 other than the application terminated in operation S2113.

In operation S2115, when it is determined that there is no application that is being executed in the terminal device 100 other than the application which is terminated in operation S2113, it may be considered that there is no application to be displayed on the display screen 110 of the terminal device 100. Therefore, the terminal device 100 may display the initial screen of the terminal device 100, for example, the home screen or the application drawer screen on the full-sized window 112.

When it is determined that there is an application that is being executed in the terminal device 100 in operation S2117, the terminal device 100 may display an execution screen of the application, which is determined in operation S2115 as being executed, on the sub-window 111.

Moreover, when the list of sub-windows is displayed instead of the sub-window 111 in operation S2117, sub-windows on which applications other than the terminated application are displayed may be displayed according to the preset list displaying mode, for example, the stack mode or the list mode.

In an embodiment of the present disclosure, when an input for requesting the termination of an application is received, the terminal device 100 may terminate the applications one by one according to the execution order of the applications or the display order of the applications by terminating the application displayed on the full-sized window 112 first.

In addition, the terminal device 100 may terminate the applications one by one according to the execution order of the applications or the display order of the applications by terminating the application displayed on the sub-window 111 first when there is no application displayed on the full-sized window 112.

Also, when there is no application displayed on the full-sized window 112, the terminal device 100 may terminate the applications one by one according to the execution order of the applications or the display order of the applications by terminating the application displayed on the uppermost or foremost sub-window first among the sub-windows displayed on the list of the sub-windows.

Figure 22A:
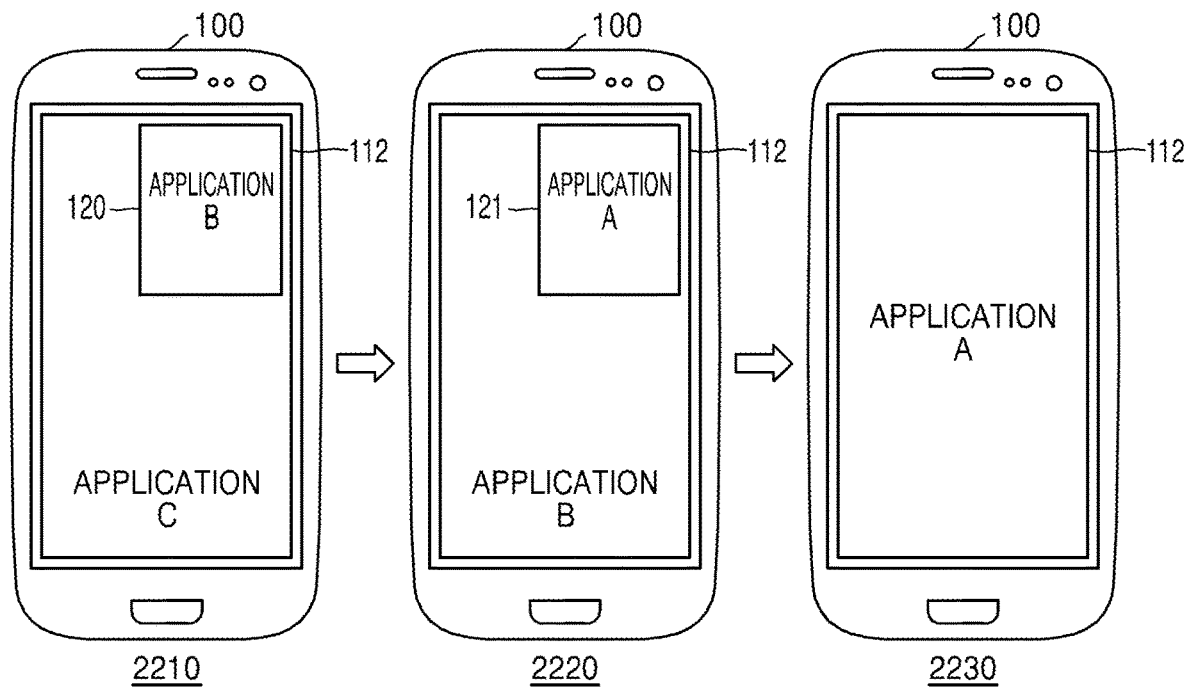
FIGS. 22A and 22B are examples of methods of displaying applications when terminating the applications according to various embodiments of the present disclosure.
Figure 22B:
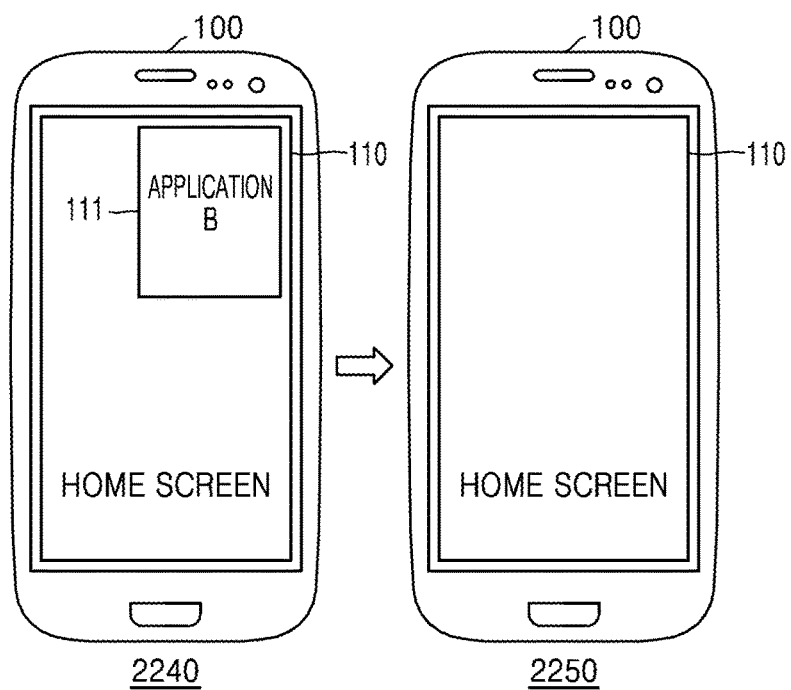

FIGS. 22A and 22B are examples of methods of displaying execution screens of applications when terminating the applications according to various embodiments of the present disclosure.

Referring to FIG. 22A, an example is illustrated of a method of displaying applications when terminating the applications when a full-sized window 112 and a sub-window 120 display the execution screens of applications.

Referring to display screen 2210, the full-sized window 112 and the sub-window 120 display the execution screens of the applications. In this case, the terminal device 100 may receive an input for requesting the termination of the application. The display screen 2210 may correspond to operation S2101 of FIG. 21.

Referring to display screen 2220, an execution screen of an application C displayed on the full-sized window 112 is terminated, and then an execution screen of an application B displayed on the sub-window 120 may be displayed on the full-sized window 112. Also, an execution screen of an application A is being executed in the terminal device 100, and not the applications B and C, and the execution screen of the application A may be displayed on a sub-window 121 instead of the execution screen of the application B. The display screen 2220 may correspond to operations S2105, S2107, 52109, S2115 and 52117 of FIG. 21. In the display screen 2220, the terminal device 100 may receive the input for requesting the termination of the applications again.

Referring to display screen 2230, the terminal device 100 may receive input for requesting the termination of the application again in the display screen 2220, the execution screen of the application B displayed on the full-sized window 112 may be terminated. In addition, the terminal device 100 may display the execution screen of the application A, which has been displayed on the sub-window 121, on the full-sized window 112 instead of the sub-window 121. The display screen 2230 shows that there is no sub-window 121 because the application A is the only application being executed in the terminal device 100. The display screen 2230 may correspond to operations S2115 and 52117 of FIG. 21.

Referring to FIG. 22B, an example is illustrated of a method of displaying an execution screen of an application when terminating the application when a sub-window only displays an application.

Referring to display screen 2240, an execution screen of the application is displayed on the sub-window 111. An initial screen of the terminal device for executing a new application, for example, the home screen or the application drawer screen, may be displayed on the full-sized window 112. The display screen 2240 may correspond to operation S2101 of FIG. 21.

Referring to display screen 2250, the terminal device 100 may terminate the application B displayed on the sub-window 111 when the input for requesting the termination of the application is received. The display screen 2250 shows that only the initial screen of the terminal device 100 is displayed because there is no application being executed after the application B is terminated. The display screen 2250 may correspond to operation S2115 of FIG. 21.

Figure 23:
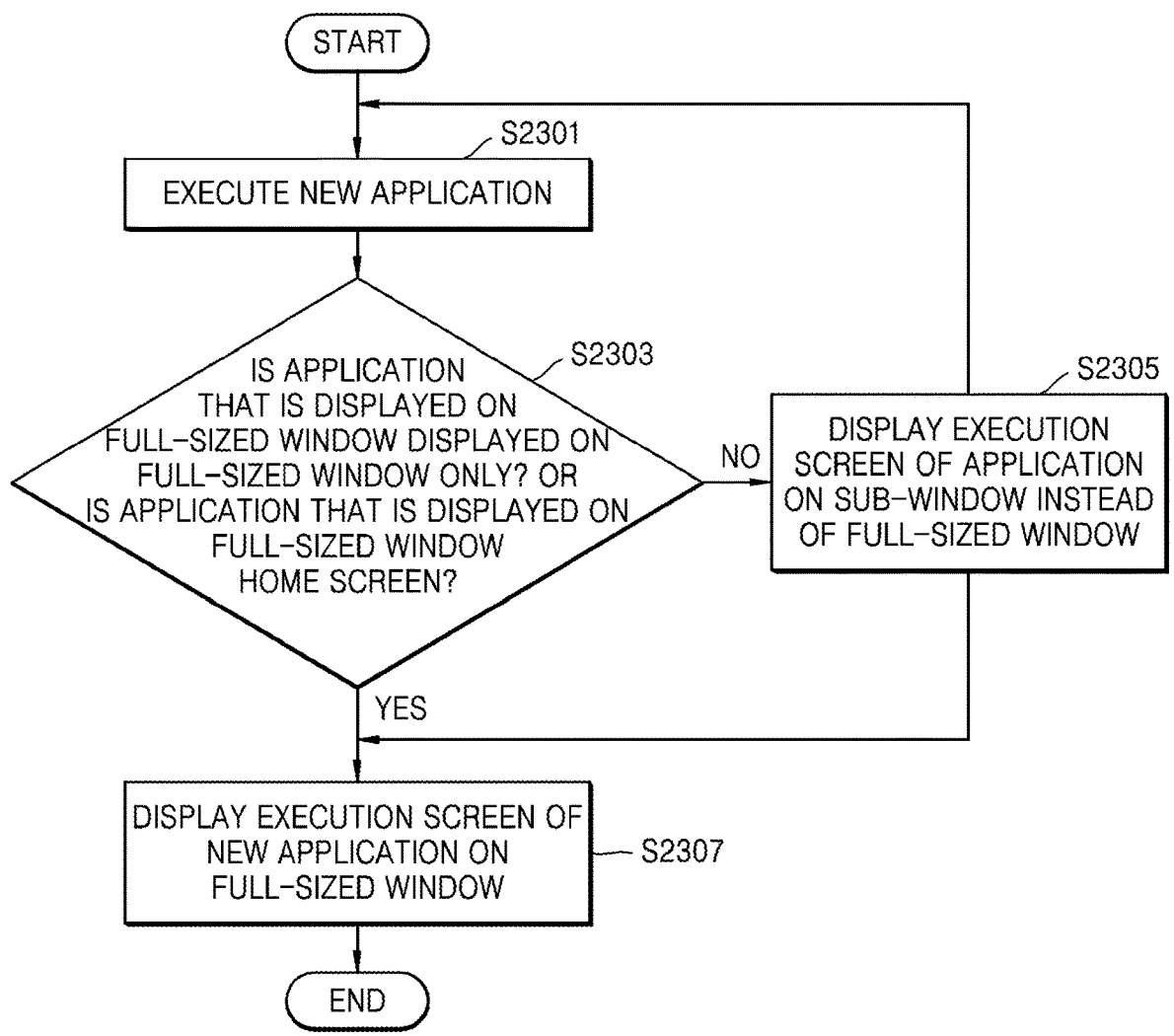
FIG. 23 is a flowchart of a method of displaying applications according to an embodiment of the present disclosure.

FIG. 23 is a flowchart of a method of displaying applications according to an embodiment of the present disclosure.

Referring to FIG. 23, in operation S2301, the terminal device 100 may execute a new application. In this case, the sub-window 111 may not be displayed on the display screen 110 of the terminal device 100.

In addition, in operation S2301, the terminal device 100 may receive an input for displaying the home screen.

In operation S2303, the terminal device 100 may determine whether the screen displayed on the full-sized window 112 is an execution screen of an application or the home screen. That is, the terminal device 100 may determine whether the screen displayed on the full-sized window 112 may be displayed only on the full-sized window 112 or may also be displayed on the sub-window 111. The home screen may be set to be displayed only on the full-sized window 112 not on the sub-window 111.

The initial screen of the terminal device 100, for example, the home screen or the application drawer screen, is for executing applications, and thus, it may be considered that, when the terminal device 100 executes a new application, there is no need to display the home screen or the application drawer screen onto the sub-window 111 instead of the full-sized window 112 and continue to check the home screen or the application drawer screen.

Therefore, the initial screen of the terminal device 100 such as the home screen or the application drawer screen may be set to be displayed only on the full-sized window 112 not on the sub-window 111. However, there may be an application that is set to be displayed only on the full-sized window 112 except for the initial screen of the terminal device such as the home screen or the application drawer screen.

In operation S2307, the terminal device 100 may not display the sub-window 111 and may display an execution screen of a new application on the full-sized window 112. When an execution screen of another application is already displayed on the sub-window 111 in operation S2301, the execution screen of the application may continue to be displayed on the sub-window 111 even though a new application is executed.

When it is determined that the execution screen of the application displayed on the full-sized window 112 may be displayed on the sub-window 111 in operation S2303, the terminal device 100 may display the execution screen of the application, which has been displayed on the full-sized window 112, on the sub-window 111 in operation S2305. In operation S2307, an execution screen of a new application may be displayed on the full-sized window 112.

Figure 24:
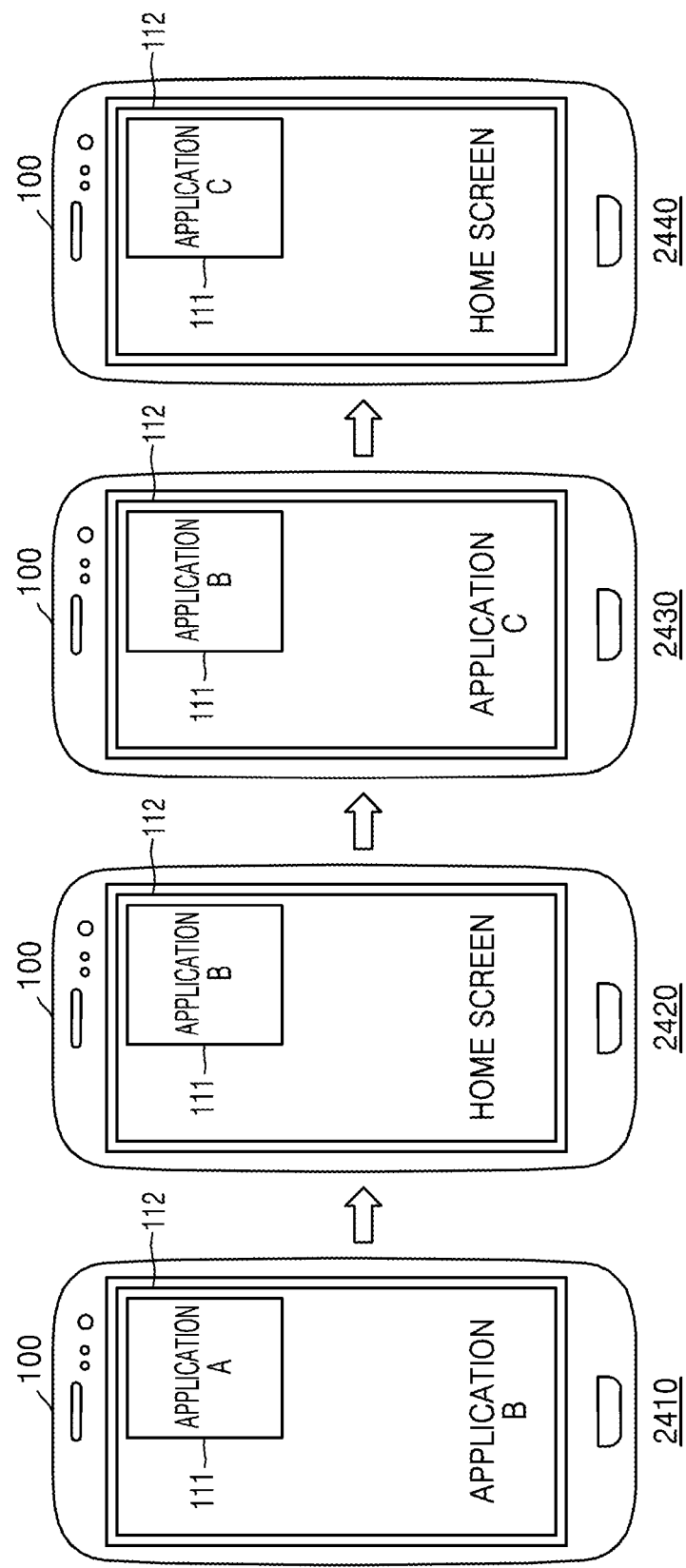
FIG. 24 illustrates examples of methods of displaying applications according to an embodiment of the present disclosure.

FIG. 24 illustrates examples of methods of displaying applications according to an embodiment of the present disclosure.

Referring to FIG. 24, the full-sized window 112 and sub-window 111 of display screen 2410 may display execution screens of applications, respectively.

Referring to display screen 2420, the home screen may be displayed on the full-sized window 112 as a new application. Also, an execution screen of an application B displayed on the full-sized window 112 may be displayed on the sub-window 111. The display screen 2420 may correspond to operation S2305 of FIG. 23.

Referring to display screen 2430, an application C may be displayed on the full-sized window 112 as a new application. Since the home screen displayed on the full-sized window 112 may not be displayed on the sub-window 111, the sub-window 111 may continue to display the application B. The display screen 2430 may correspond to operation S2307 of FIG. 23.

Referring to display screen 2440, the home screen may be displayed on the full-sized window 112 as a new application. Also, an execution screen of the application C displayed on the full-sized window 112 may be displayed on the sub-window 111. The display screen 2440 may correspond to operation S2305 of FIG. 23.

A structure of a terminal device 2500 will be described with reference to FIGS. 25A and 25B.

Figure 25A:
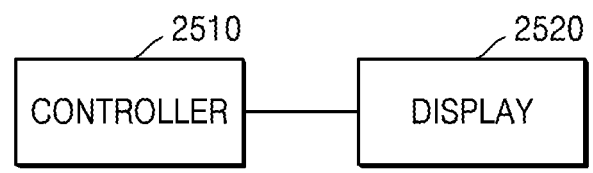
FIGS. 25A and 25B are block diagrams of devices according to various embodiments of the present disclosure.
Figure 25B:
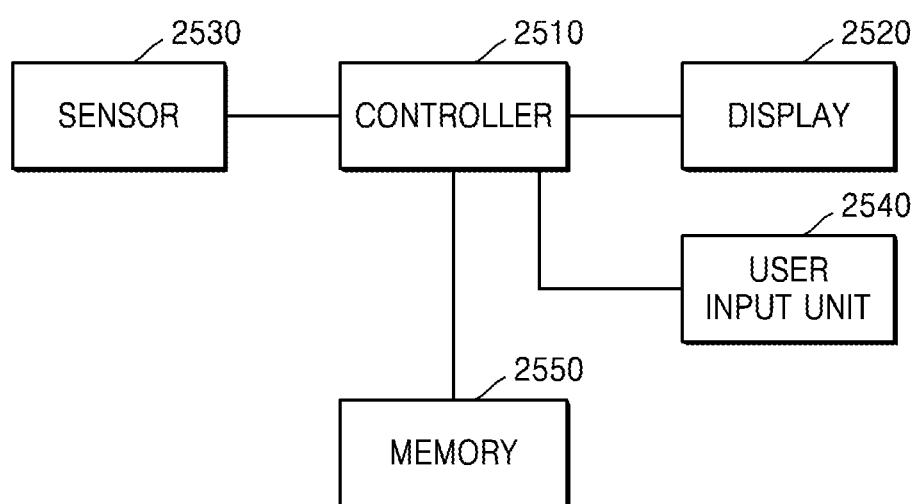

FIGS. 25A and 25B are block diagrams of devices according to various embodiments of the present disclosure.

Referring to FIGS. 25A and 25B, a terminal device 2500 may perform the method of displaying the applications as described above with reference to FIGS. 1A to 22B.

Referring to FIG. 25A, the terminal device 2500 may include a controller 2510 and a display 2520. However, all components of the terminal device 2500 are not essential. The terminal device 2500 may be executed by more or less components described herein.

In general, the controller 2510 controls overall operations of the terminal device 2500. For example, the controller 2510 controls the sub-window 111 and the full-sized window 112 displaying execution screens of applications and may control the display screen 110. That is, the controller 2510 may generally control the display 2520.

The display 2520 may display and output information processed by the display 2520. For example, the display 2520 may display the sub-window 111 or the full-sized window 112 controlled by the controller 2510.

The controller 2510 displays an execution screen of a first application on a first area when the first application is executed, and when a second application is executed while the first application is executed, the controller 2510 may control the display 2520 to display the execution screen of the first application onto a second area instead of the first area and to display an execution screen of the second application on the first area. The first and second areas may indicate the full-sized window 112 and the sub-window 111, respectively.

Referring to FIG. 25B, another example of a terminal device 2500 may include the controller 2510, the display 2520, a sensor 2530 and a user input unit 2540. However, all components of the terminal device 2500 are not essential. The terminal device 2500 may be executed by more or less components described herein.

The controller 2510 and the display 2520 corresponds to the controller 2510 and the display 2520 of FIG. 25A, and thus, repeated descriptions will be omitted.

The sensor 2530 detects current states of the terminal device 2500 such as a location thereof, whether to contact the user, a bearing, deceleration/acceleration and a tilt of the terminal device 2500 and generates sensing signals for controlling operations of the sensor 2530.

The sensor 2530 may include a variety of sensors for detecting touches on a touch screen or proximity touches on the touch screen. A sensor for detecting the touches on the touch screen may be a tactile sensor. The tactile sensor may be a sensor for detecting a contact of a specific object to a degree of human sensitivity. The tactile sensor may detect a variety of information such as the roughness of a contact surface, the hardness of a contacting object, the temperature of a contacting point, or the like.

In addition, the sensor for detecting the touches on the touch screen may be a proximity sensor.

The proximity sensor is a sensor for detecting whether there is an object approaching the contact surface or whether there is an object around the contact surface by using power of an electromagnetic field or without mechanical contacts. Therefore, the proximity sensor has a fairly long lifespan and may be variously used compared to a contact-type sensor.

Examples of the proximity sensor are a penetrating-type photoelectric sensor, a direct-reflex photoelectric sensor, a mirror-reflex photoelectric sensor, a high-frequency oscillation-type proximity sensor, a capacitive sensor, a magnetic proximity sensor, an infrared proximity sensor, or the like.

Therefore, the sensor 2530 may detect gestures for controlling the full-sized window 112 or the sub-window 111. For example, the sensor 2530 may detect gestures of the user such as a dragging gesture, a flicking gesture, a tapping gesture, a double tapping gesture, or the like. In this regard, the sensor 2530 may detect a direction, speed, length of the gestures, etc.

The sensor 2530 may detect gestures for changing a display area of an execution screen of an application, which is displayed on the sub-window 111, from the sub-window 111 to the full-sized window 112 and for displaying an execution screen of an application, which is selected from among applications being executed in the terminal device 2500, on the sub-window 111.

The sensor 2530 may detect a user gesture for hiding the sub-window 111 or whether there is an input with regard to the sub-window 111 for a predetermined amount of time or more. Therefore, according to detection results from the sensor 2530, the controller 2510 may control the display 2520 to display at least one of alternative images, which indicate some portions of the sub-window 111, a transparent portion of the sub-window 111 and the sub-window 111, instead of the sub-window 111 in a case where no user gesture is input for hiding the sub-window 111 or input with regard to the sub-window 111 for a predetermined amount of time or more.

The sensor 2530 may detect a user gesture for displaying a list. Therefore, in response to the detected gesture for displaying the list, the controller 2510 may control the display 2520 to display an execution screen of at least one application, which is selected from among applications being executed in the terminal device 2500, on the sub-window 111 according to a sub-window displaying method.

The user input unit 2540 generates input data for controlling operations of the terminal device 2500. The user input unit 2540 may include a keypad, a dome switch, a touch pad (constant pressure/electrostatic types), a jog wheel, a jog switch, a physical button, etc. In particular, the touch pad may be referred to as a touch screen when the touch pad forms an interlayer structure with the display 150.

In the present embodiment, the user input unit 2540 may include a termination button for terminating applications being executed in the terminal device 2500.

When the display 2520 and the touch pad have the interlayer structure and form the touch screen, the display 2520 may also be used as not only an output device but also an input device. The display 2520 may include at least one of a liquid crystal display (LCD), a thin film transistor-LCD (TFT-LCD), an organic light-emitting diode (OLED) display, a flexible display, and a three-dimensional (3D) display. There may be at least two displays according to a configuration type of the terminal device 2500. The touch screen may be formed to detect locations, extents, and the pressure of touch inputs. Moreover, the touch screen may be formed to detect real touches as well as proximity touches.

Throughout the specification, the "real-touches" mean that a pointer actually touches a screen, and the "proximity touches" mean that the pointer does not directly touches the screen and approaches the screen from a predetermined distance. In the present specification, the pointer is a tool for touching a specific area of a displayed screen or generating proximity touches, and examples of the pointer are a stylus pen, fingers, etc.

A memory 2550 may store applications that may be executed in the terminal device 2500.

The memory 2550 may include at least one storage medium selected from among a flash memory type memory, a hard disk type memory, a multimedia card micro type memory, a card-type memory (e.g., a secure digital (SD) memory, an ex-divided (XD) memory, etc.) random access memory (RAM), read-only memory (ROM), electrically erasable programmable ROM (EEPROM), PROM, a magnetic memory, a magnetic disk, and an optical disk. In addition, the terminal device 2500 may operate a web storage that performs a storage function of the memory 2550 on the Internet.

According to various embodiments, display areas of applications displayed on a full-sized window and a sub-window may be easily changed.

As described above, according to various embodiments, an application displayed on a full-sized window and applications displayed on sub-windows In addition, other various embodiments can also be executed through computer readable code/instructions in/on a medium, e.g., a computer readable medium, to control at least one processing element to execute any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., compact disc-ROMs (CD-ROMs), or digital versatile discs (DVDs)), and transmission media such as Internet transmission media.

It should be understood that the various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by an electronic device, the method comprising:
   displaying an application on a full-sized window;
   based on receiving a user input for displaying the application on a sub window, which overlaps at least a portion of a display area used for the full-sized window, instead of the full-sized window, displaying the application on the sub window, which overlaps the at least the portion of the display area used for the full-sized window, instead of the full-sized window;
   detecting a first gesture on the application for requesting the application to be displayed in a hide mode;
   based on the first gesture being detected on the application for requesting the application to be displayed in the hide mode, hiding the application and displaying an alternative image indicating the application on the full-sized window;
   detecting a second gesture on the alternative image for releasing the hide mode; and
   based on the second gesture being detected on the alternative image for releasing the hide mode, displaying the application on the sub window again without displaying the alternative image.

2. The method of claim 1, further comprising:
   based on a third gesture being detected for displaying a list of a plurality of applications that are displayed as overlapping at least a portion of the display area used for the full-sized window and then hidden, displaying a plurality of alternative images corresponding to the hidden plurality of applications overlapping at least a portion of the display area used for the full-sized window; and
   based on a fourth gesture being detected for selecting an alternative image from among the plurality of alternative images, displaying an application corresponding to the selected alternative image overlapping at least a portion of the display area used for the full-sized window.

3. The method of claim 1, wherein the alternative image indicating the application is displayed in a bookmark shape.

4. The method of claim 1, wherein the second gesture for releasing the hide mode comprises a tapping gesture.

5. The method of claim 1, wherein the displaying of the application on the full-sized window comprises:
   displaying a list of one or more applications; and
   based on receiving a user input of selecting the application from the list of the one or more applications, displaying the application on the full-sized window.

6. The method of claim 1, further comprising:
   based on a third gesture being detected for moving the sub window displaying the application, moving the sub window so as to overlap at least a different portion of the display area used for the full-sized window according to the detected third gesture for moving the sub window displaying the application.

7. The method of claim 1, further comprising:
   based on a third gesture being detected for displaying the application on the full-sized window, displaying the application on the full-sized window instead of the sub window.

8. An electronic device comprising:
   a display;
   a user input unit;
   memory storing one or more computer programs; and
   one or more processors communicatively coupled to the display, the user input unit, and the memory,
   wherein the one or more computer programs include computer-executable instructions that, when executed by the one or more processors, cause the electronic device to:
   display an application on a full-sized window;
   based on receiving a user input for displaying the application on a sub window, which overlaps at least a portion of a display area used for the full-sized window, instead of the full-sized window, display the application on the sub window, which overlaps the at least the portion of the display area used for the full-sized window, instead of the full-sized window;
   detect a first gesture on the application for requesting the application to be displayed in a hide mode;
   based on the first gesture being detected on the application for requesting the application to be displayed in the hide mode, hide the application and display an alternative image indicating the application on the full-sized window;
   detect a second gesture on the alternative image for releasing the hide mode; and
   based on the second gesture being detected on the alternative image for releasing the hide mode, display the application on the sub window again without displaying the alternative image.

9. The method of claim 2, wherein the plurality of alternative images corresponding to the hidden plurality of applications are displayed in an order of execution of the hidden plurality of applications.

10. The electronic device of claim 8, wherein the one or more computer programs further include computer-executable instructions that, when executed by the one or more processors, cause the electronic device to:
    based on a third gesture being detected for displaying a list of a plurality of applications that are displayed as overlapping at least a portion of the display area used for the full-sized window and then hidden, display a plurality of alternative images corresponding to the hidden plurality of applications overlapping at least a portion of the display area used for the full-sized window; and
    based on a fourth gesture being detected for selecting an alternative image from among the plurality of alternative images, display an application corresponding to the selected alternative image overlapping at least a portion of the display area used for the full-sized window.

11. The electronic device of claim 8, wherein the alternative image indicating the application is displayed in a bookmark shape.

12. The electronic device of claim 8, wherein the second gesture for releasing the hide mode comprises a tapping gesture.

13. The electronic device of claim 8, wherein the one or more computer programs further include computer-executable instructions that, when executed by the one or more processors, cause the electronic device to:
- display a list of one or more applications, and
- based on receiving a user input of selecting the application from the list of the one or more applications, display the application on the full-sized window.

14. The electronic device of claim 8, wherein the one or more computer programs further include computer-executable instructions that, when executed by the one or more processors, cause the electronic device to, based on a third gesture being detected for moving the sub window displaying the application, move the sub window so as to overlap at least a different portion of the display area used for the full-sized window according to the detected third gesture for moving the sub window displaying the application.

15. The electronic device of claim 8, wherein the one or more computer programs further include computer-executable instructions that, when executed by the one or more processors, cause the electronic device to, based on a third gesture being detected for displaying the application on the full-sized window, display the application on the full-sized window instead of the sub window.

16. The electronic device of claim 10, wherein the plurality of alternative images corresponding to the hidden plurality of applications are displayed in an order of execution of the hidden plurality of applications.

17. One or more non-transitory computer-readable storage media storing one or more computer programs including computer-executable instructions that, when executed by one or more processors of an electronic device, cause the electronic device to perform operations, the operations comprising:
- displaying an application on a full-sized window;
- based on receiving a user input for displaying the application on a sub window, which overlaps at least a portion of a display area used for the full-sized window, instead of the full-sized window, displaying the application on the sub window, which overlaps the at least the portion of the display area used for the full-sized window, instead of the full-sized window;
- detecting a first gesture on the application for requesting the application to be displayed in a hide mode;
- based on the first gesture being detected on the application for requesting the application to be displayed in the hide mode, hiding the application and displaying an alternative image indicating the application on the full-sized window;
- detecting a second gesture on the alternative image for releasing the hide mode; and
- based on the second gesture being detected on the alternative image for releasing the hide mode, displaying the application on the sub window again without displaying the alternative image.

18. The one or more non-transitory computer-readable storage media of claim 17, wherein the alternative image indicating the application is displayed in a bookmark shape.

19. The one or more non-transitory computer-readable storage media of claim 17, wherein the second gesture for releasing the hide mode comprises a tapping gesture.

20. The one or more non-transitory computer-readable storage media of claim 17, wherein to display the application on the full-sized window comprises the operations further comprise:
- displaying a list of one or more applications; and
- based on receiving a user input of selecting the application from the list of the one or more applications, displaying the application on the full-sized window.

* * * * *